United States Patent
Kosaka et al.

(10) Patent No.: US 11,702,169 B2
(45) Date of Patent: *Jul. 18, 2023

(54) HYDRAULIC OPERATING DEVICE FOR HUMAN-POWERED VEHICLE

(71) Applicant: Shimano Inc., Osaka (JP)

(72) Inventors: Kentaro Kosaka, Osaka (JP); Yusuke Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 95 days.

This patent is subject to a terminal disclaimer.

(21) Appl. No.: 16/694,743

(22) Filed: Nov. 25, 2019

(65) Prior Publication Data

US 2021/0061407 A1 Mar. 4, 2021

Related U.S. Application Data

(63) Continuation-in-part of application No. 16/560,474, filed on Sep. 4, 2019, now abandoned.

(51) Int. Cl.
*B62L 3/02* (2006.01)
*B62K 23/06* (2006.01)

(52) U.S. Cl.
CPC .............. *B62L 3/023* (2013.01); *B62K 23/06* (2013.01)

(58) Field of Classification Search
CPC . B62L 3/023; B62L 3/026; B62L 3/02; B62K 23/06; B62K 25/04; B60T 7/102;
(Continued)

(56) References Cited

U.S. PATENT DOCUMENTS 5,678,665 A 10/1997 Debreczeni
5,813,501 A * 9/1998 Terry, Sr. .............. B60T 11/165
188/24.11

(Continued)

FOREIGN PATENT DOCUMENTS

TW 200930611 A 7/2009
WO WO 02/058988 A1 * 8/2002 ................ B62L 3/02

(Continued)

OTHER PUBLICATIONS

Define approach, Google search, Apr. 19, 2022 (Year: 2022).*
(Continued)

*Primary Examiner* — Vinh Luong
(74) *Attorney, Agent, or Firm* — Global IP Counselors, LLP

(57) ABSTRACT

A hydraulic operating device is provided for a human-powered vehicle. The hydraulic operating device basically includes a base, an operating member and a handlebar mounting structure. The base includes a cylinder bore defining a cylinder axis. The operating member is pivotally coupled to the base about a pivot axis between a rest position and an operated position. The handlebar mounting structure is coupled to the base. The handlebar mounting structure defines a handlebar mounting axis that extends linearly along a handlebar in a mounted state. The cylinder axis is inclined towards the handlebar mounting axis as the cylinder bore extends away from the pivot axis as viewed in a pivot axis direction parallel to the pivot axis. The pivot axis is located in an area between the cylinder axis and the handlebar mounting axis as viewed in the pivot axis direction.

24 Claims, 27 Drawing Sheets

(58) Field of Classification Search
CPC ....... B62M 25/08; F15B 7/08; F15B 15/1414; B62J 43/20; B62J 1/08; B62J 6/16; B62J 2001/085
See application file for complete search history.

(56) References Cited

U.S. PATENT DOCUMENTS

| | | | |
|---|---|---|---|
| 6,263,754 B1 | 7/2001 | Wesling et al. | |
| 6,336,525 B1* | 1/2002 | Leng | B62L 1/00 |
| | | | 188/24.19 |
| 6,688,440 B2 | 2/2004 | Matsushita et al. | |
| 7,654,366 B2 | 2/2010 | Matsushita | |
| 10,486,768 B2* | 11/2019 | Hujer | B62L 3/023 |
| 2005/0056508 A1 | 3/2005 | Laghi | |
| 2005/0199450 A1* | 9/2005 | Campbell | B60T 11/22 |
| | | | 188/24.15 |
| 2011/0240425 A1* | 10/2011 | Hirose | B60T 11/16 |
| | | | 188/344 |
| 2012/0125143 A1* | 5/2012 | Thomas | G05G 1/04 |
| | | | 74/522 |
| 2013/0333994 A1* | 12/2013 | Jordan | B62L 3/023 |
| | | | 188/344 |
| 2014/0231202 A1* | 8/2014 | Shih | B62L 3/02 |
| | | | 188/344 |
| 2019/0061870 A1* | 2/2019 | Sakai | B60T 7/102 |
| 2019/0225299 A1* | 7/2019 | Komada | F15B 7/08 |
| 2021/0061404 A1* | 3/2021 | Kosaka | B62L 3/023 |
| 2021/0191448 A1* | 6/2021 | Shimizu | G05G 5/03 |
| 2022/0024537 A1* | 1/2022 | Thomas | B62L 3/023 |
| 2022/0185425 A1* | 6/2022 | Dunlap | B62K 23/06 |

FOREIGN PATENT DOCUMENTS

| | | | | |
|---|---|---|---|---|
| WO | WO 02058988 | * | 8/2002 | ............ B62L 3/02 |
| WO | WO 2019/130762 A1 | * | 7/2019 | ............ G05G 5/03 |

OTHER PUBLICATIONS

Definitions distance, dictionary.com., May 18, 2022 (Year: 2022).*
Definition of piston, merriam-webster.com. Aug. 18, 2022 (Year: 2022).*

* cited by examiner

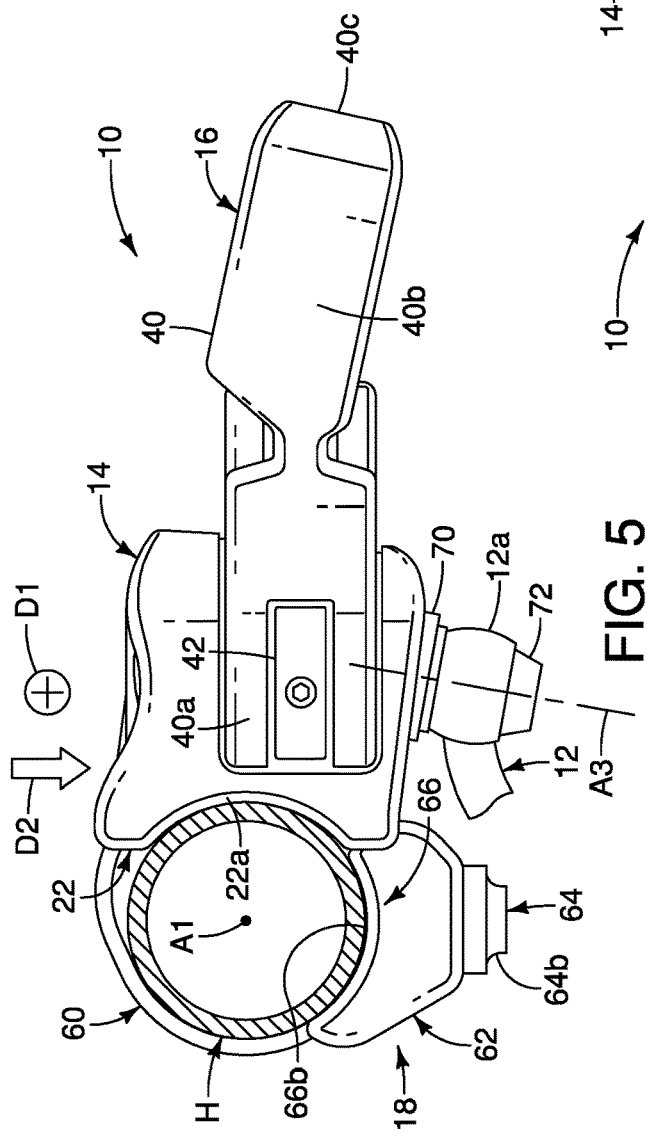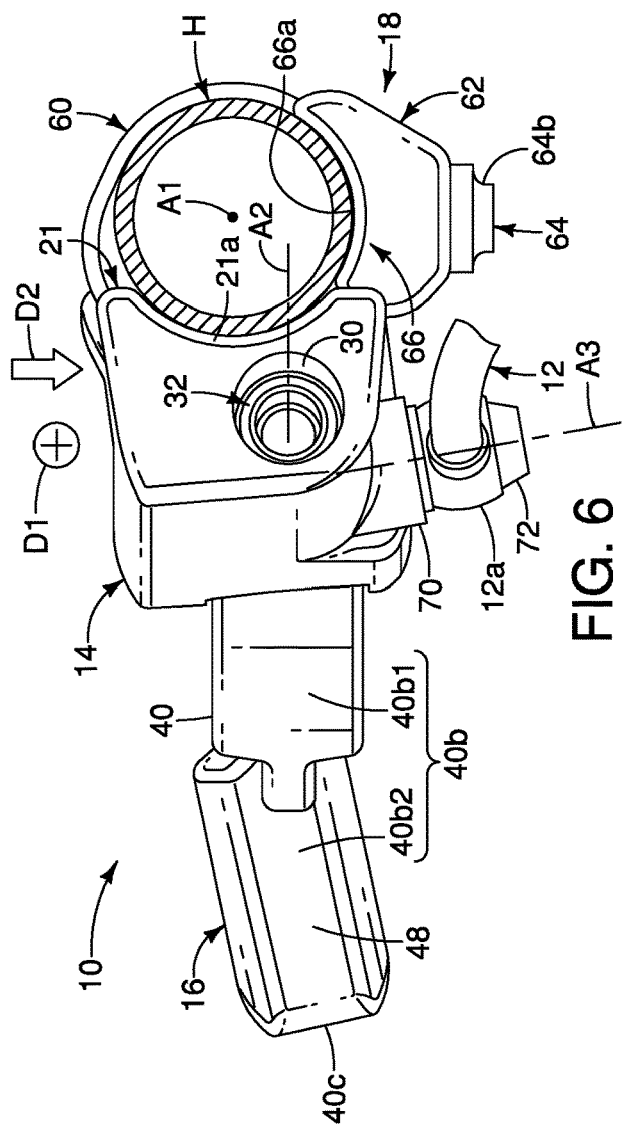

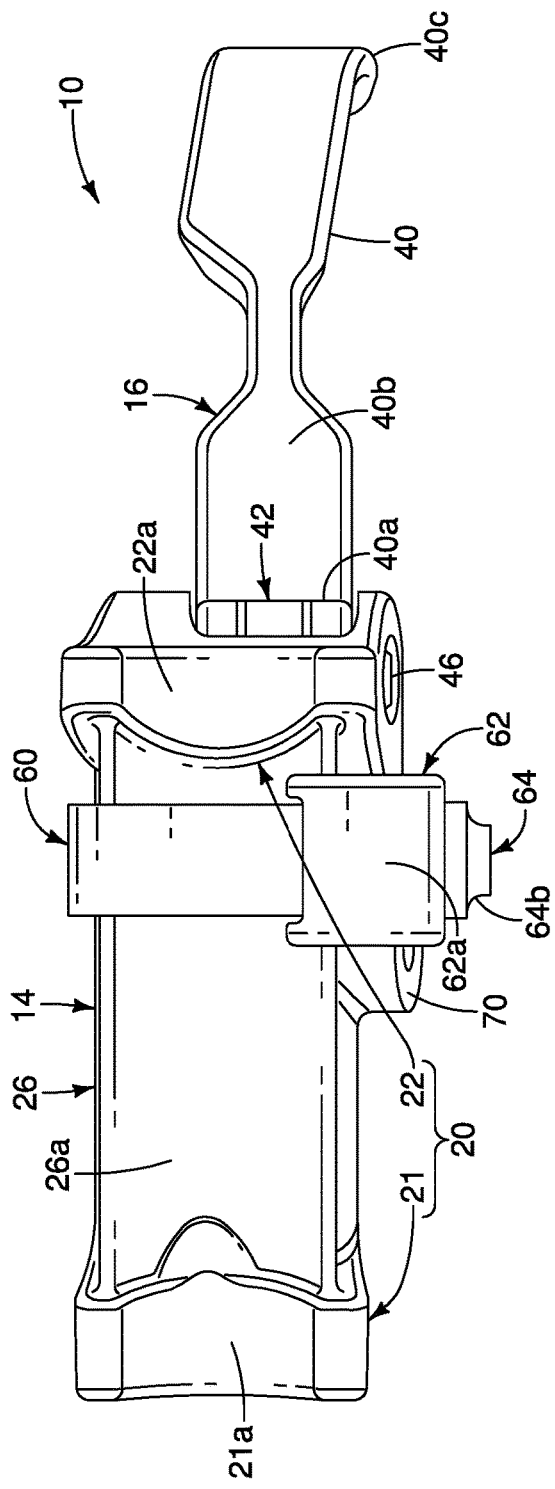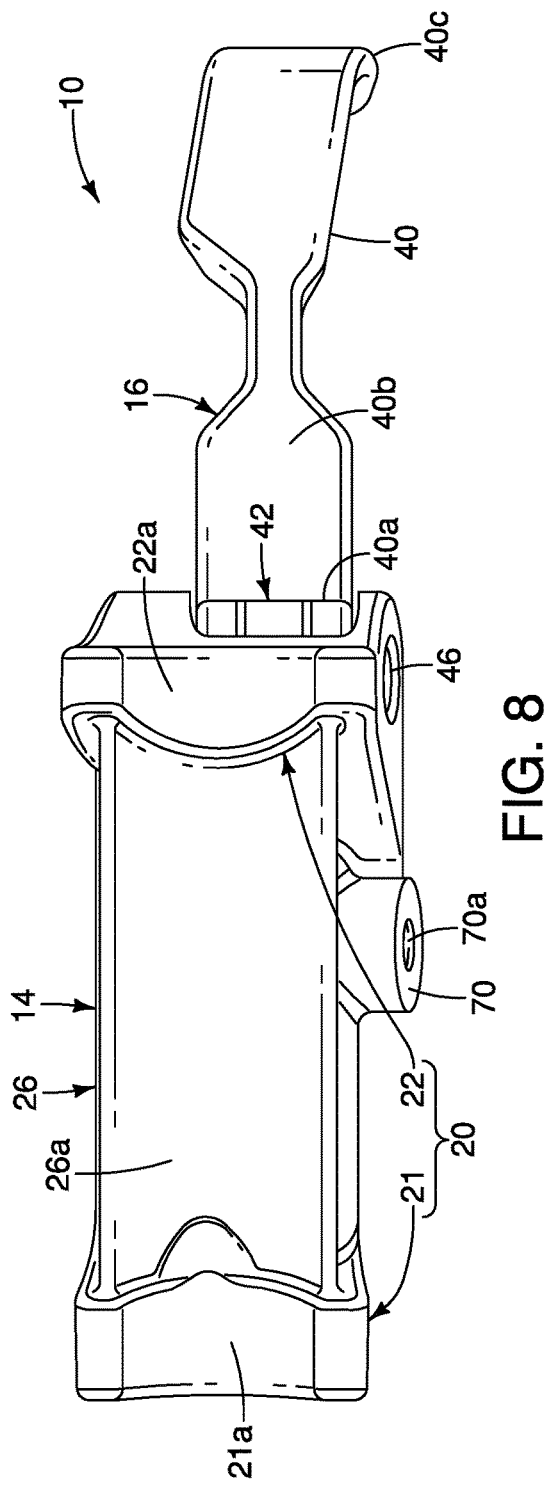

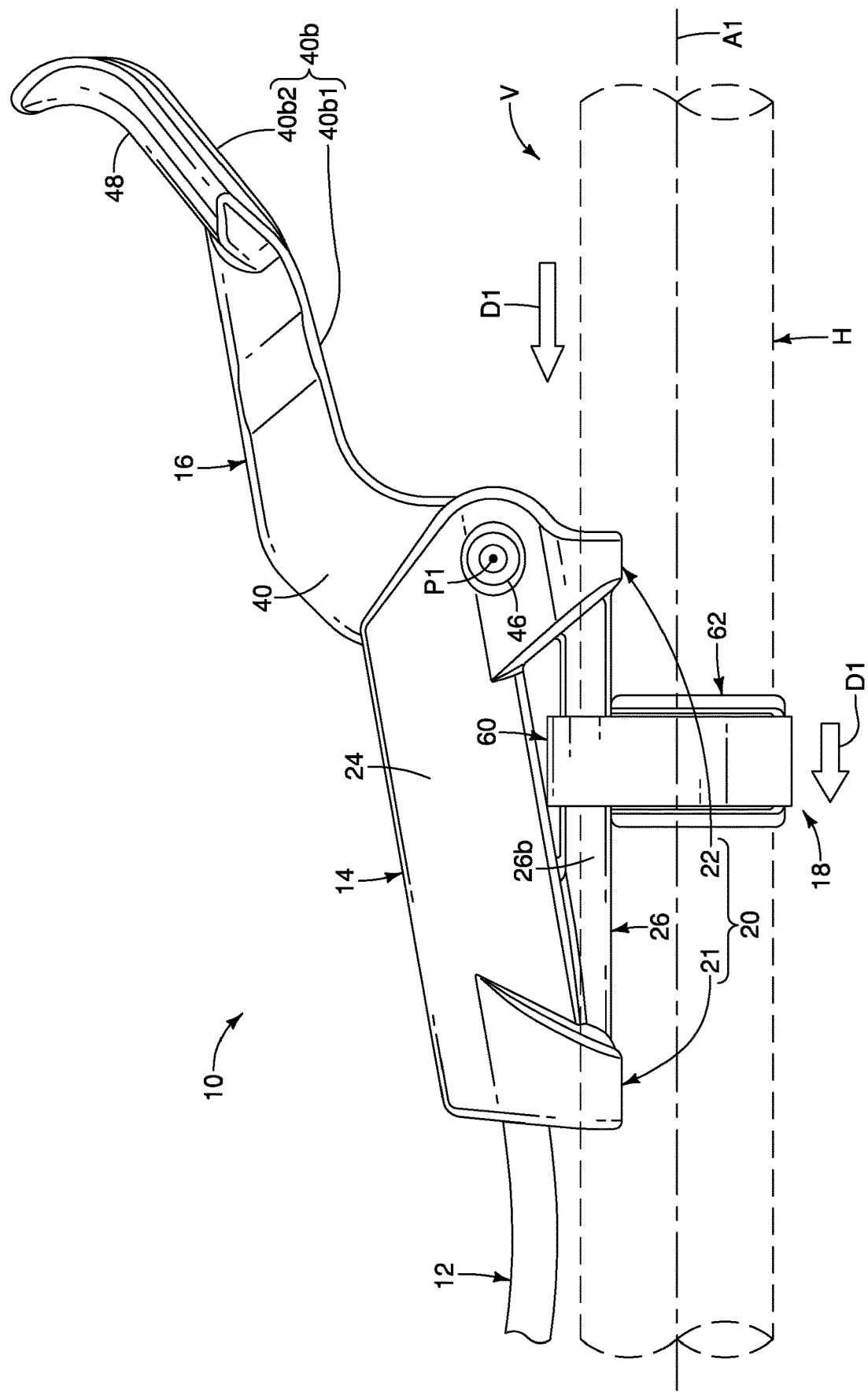

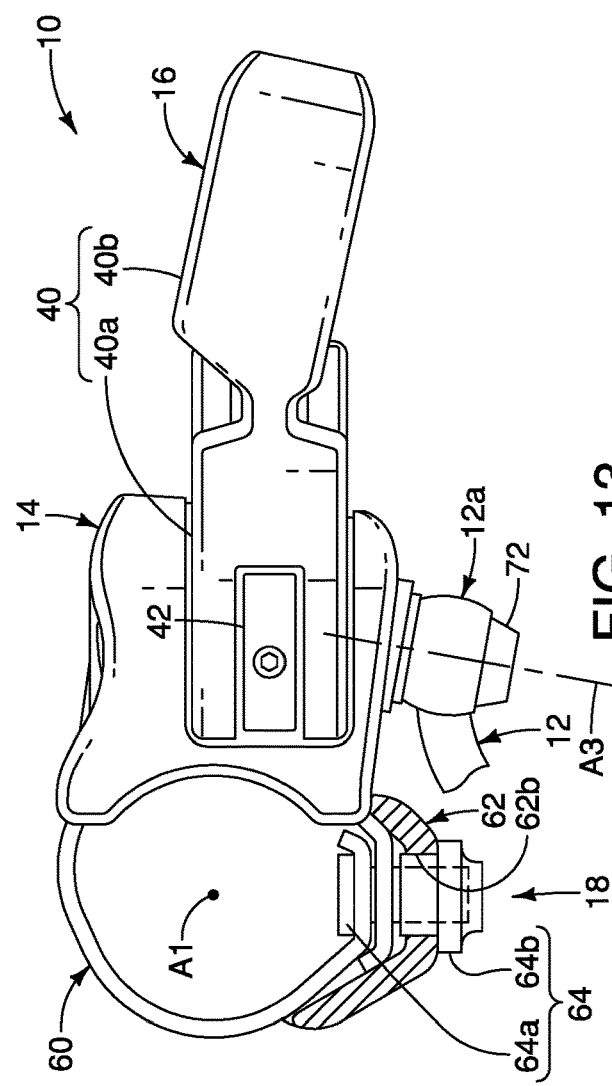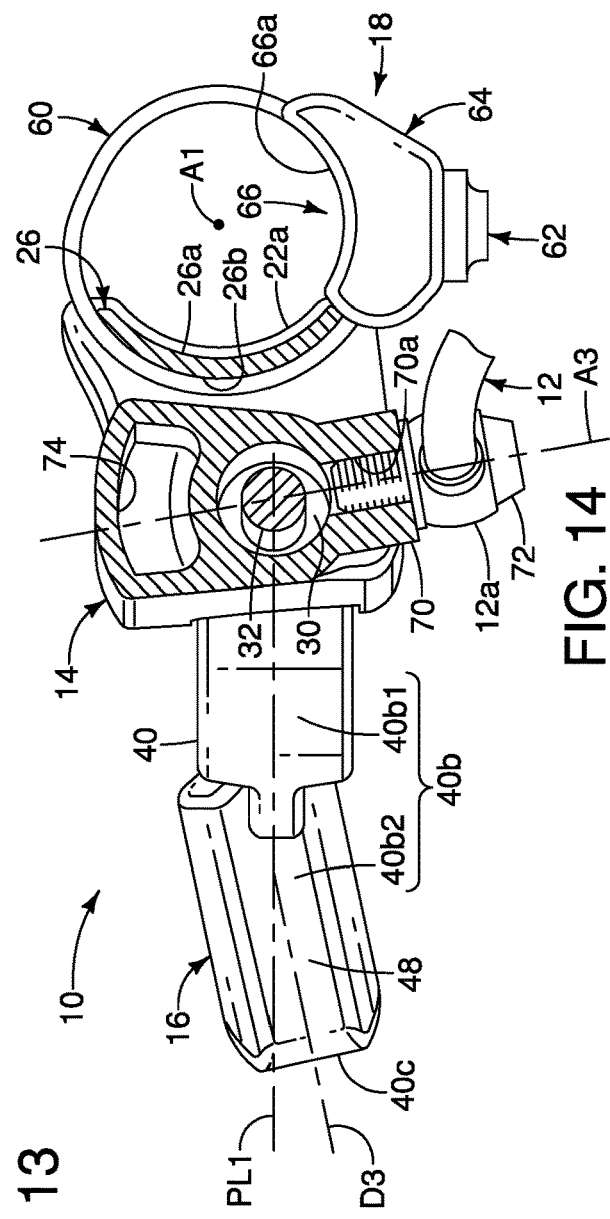

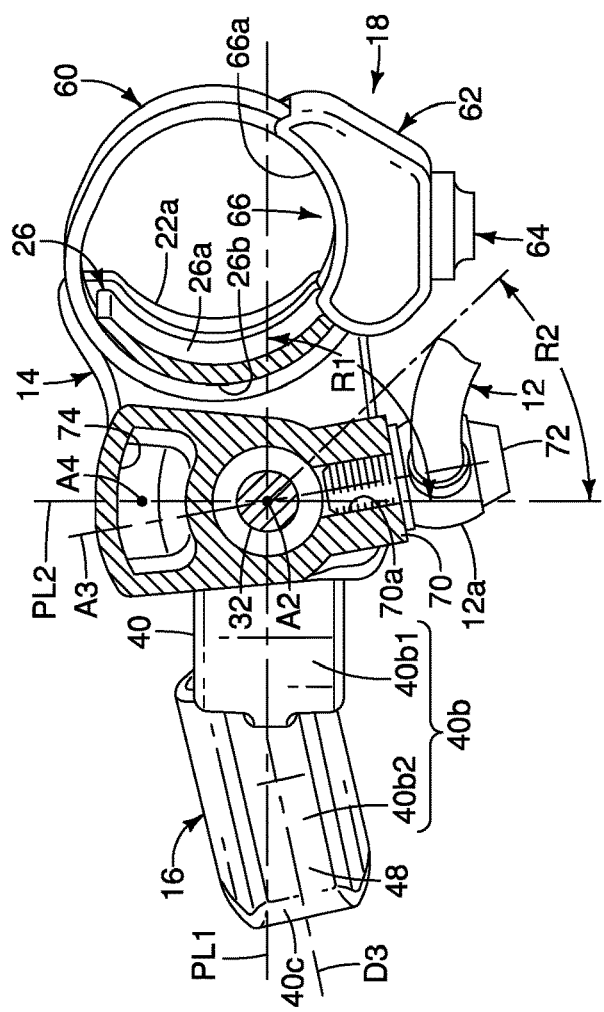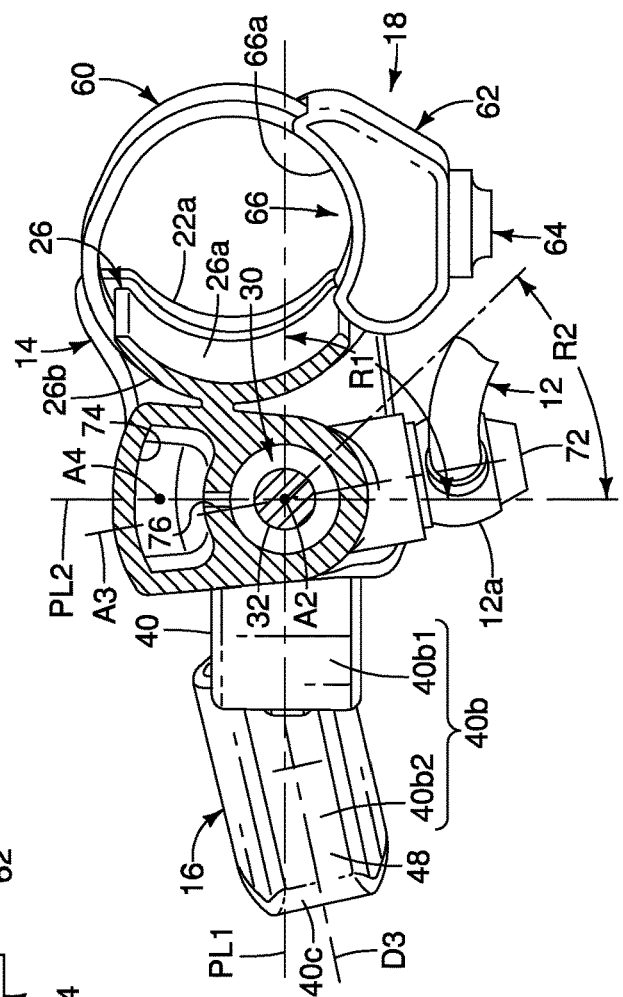

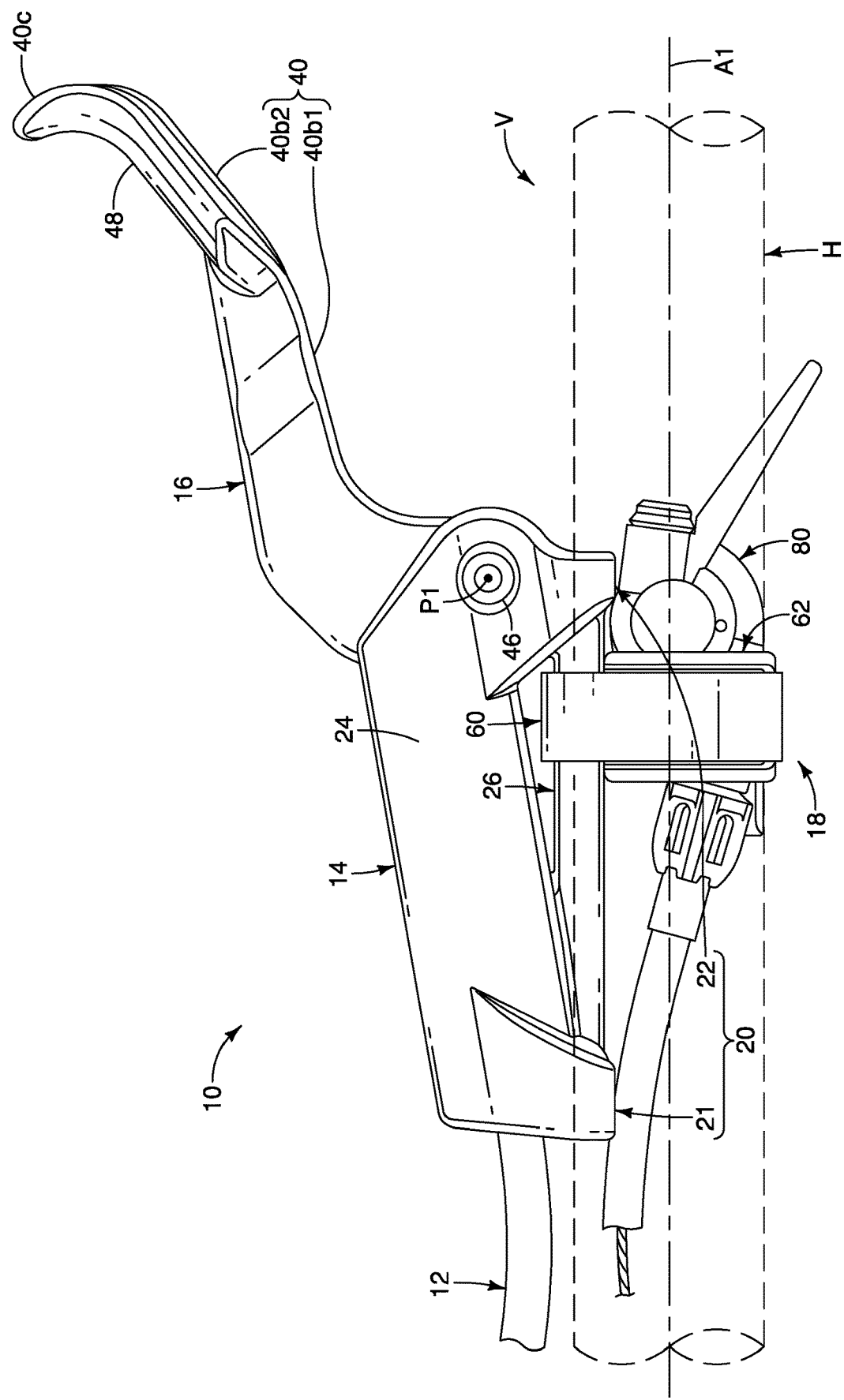

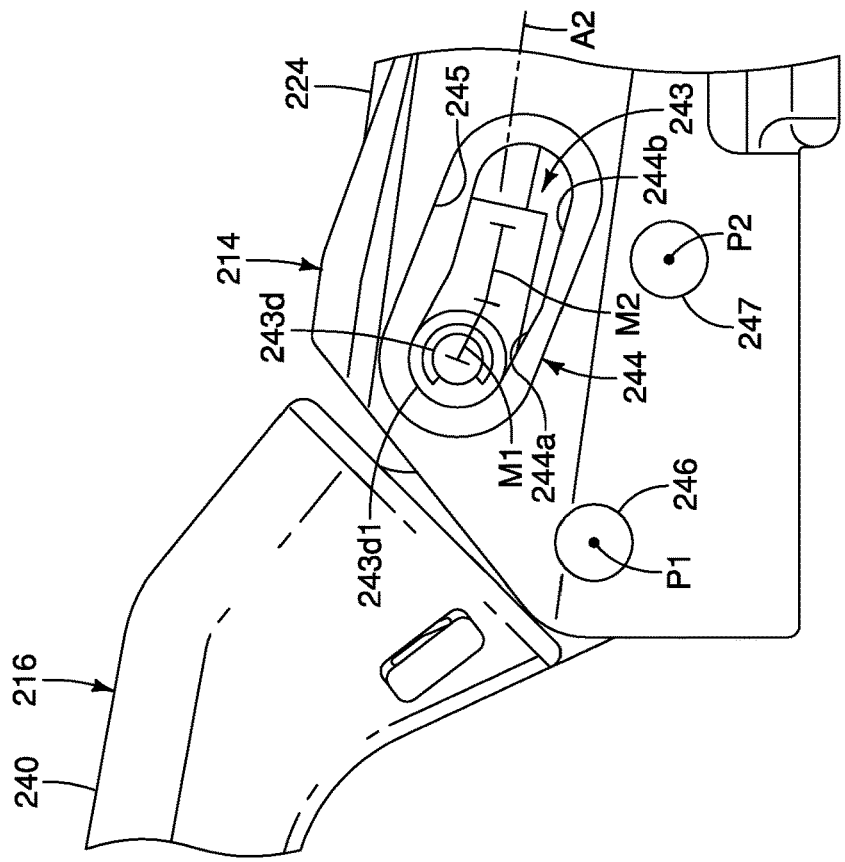
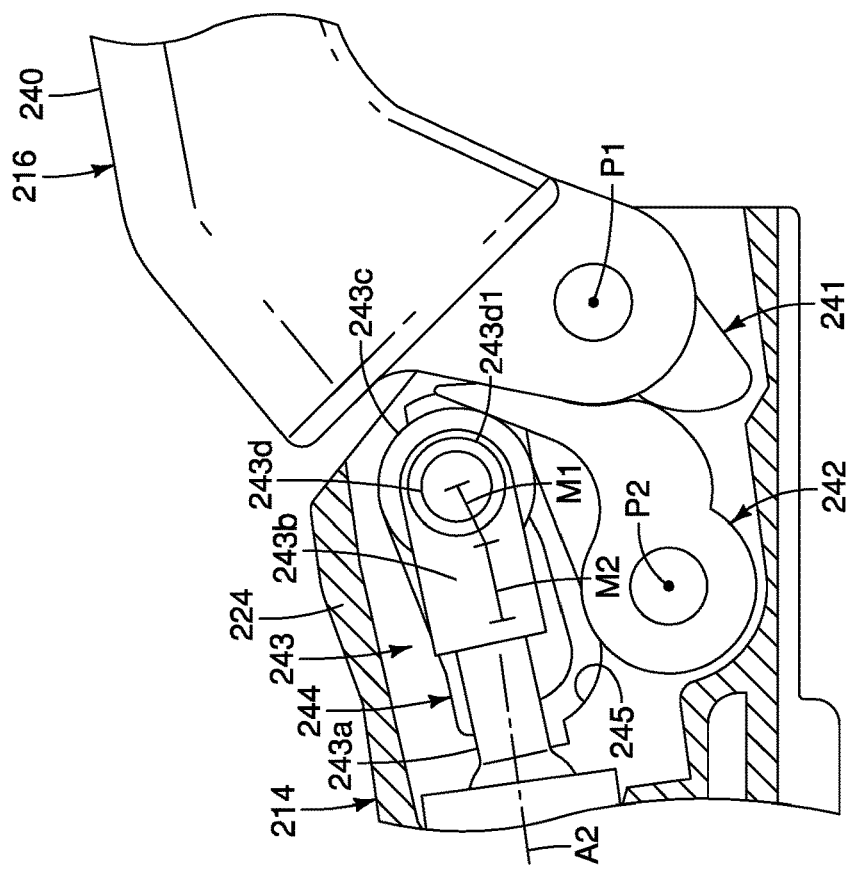

HYDRAULIC OPERATING DEVICE FOR HUMAN-POWERED VEHICLE

CROSS-REFERENCE TO RELATED APPLICATIONS

This application is a continuation-in-part application of U.S. application Ser. No. 16/560,474, filed on Sep. 4, 2016. The entire disclosure of U.S. application Ser. No. 16/560,474 is hereby incorporated herein by reference.

BACKGROUND

Technical Field

This disclosure generally relates to a hydraulic operating device for a human-powered vehicle such as a bicycle.

Background Information

Human-powered vehicles (e.g., bicycles) are typically provided with operating systems that allow the rider to control an operation of the human-powered vehicle. These operating systems include an operating device which the rider operates to control the operation of the human-powered vehicle. For example, the human-powered vehicle includes a brake system that has an operating device. The brake system is used to slow down and/or stop the human-powered vehicle in response to operation of the operating device. The brake system of the human-powered vehicle can be an electrical brake system, a mechanical brake system or a hydraulic brake system. In the case of a hydraulic brake system, the operating device is a hydraulic operating (actuating) device that is fluidly connected to a hydraulic operated device by a hydraulic hose. The hydraulic operated device is hydraulically controlled by hydraulic fluid flowing through the hydraulic hose in response to an operation of the hydraulic operating device. For example, in the case of a hydraulic brake system, a brake caliper (i.e., the hydraulic operated device) is hydraulically controlled by hydraulic fluid flowing through the hydraulic hose in response to an operation of a brake lever of the hydraulic operating device. In particular, the operation of the brake lever forces hydraulic fluid through the hydraulic hose to the brake caliper. The hydraulic fluid then moves one of more pistons to cause the brake pads to squeeze a brake rotor that is attached to a hub of a bicycle wheel.

SUMMARY

Generally, the present disclosure is directed to various features of a hydraulic operating device for a human-powered vehicle such as a bicycle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hydraulic operating device is provided for a human-powered vehicle in which the hydraulic operating device basically comprises a base, an operating member and a handlebar mounting structure. The base includes a cylinder bore defining a cylinder axis. The operating member is pivotally coupled to the base about a pivot axis between a rest position and an operated position. The handlebar mounting structure is coupled to the base. The handlebar mounting structure defines a handlebar mounting axis that extends linearly along a handlebar in a mounted state in which the base is mounted to the handlebar by the handlebar mounting structure. The cylinder axis of the cylinder bore is inclined towards the handlebar mounting axis as the cylinder bore extends away from the pivot axis as viewed in a pivot axis direction parallel to the pivot axis. The pivot axis is located in an area between the cylinder axis and the handlebar mounting axis as viewed in the pivot axis direction.

With the hydraulic operating device according to the first aspect, it is possible to provide the hydraulic operating device with a relatively compact profile with respect to the handlebar mounting axis.

In accordance with a second aspect of the present disclosure, the hydraulic operating device according to the first aspect further comprises a hydraulic reservoir connected to the cylinder bore.

With the hydraulic operating device according to the second aspect, it is possible to avoid inconsistencies in the pressure being applied by the hydraulic operating device due to volume changes of the hydraulic fluid, capacity changes of a hydraulic fluid passage or other factors.

In accordance with a third aspect of the present disclosure, a hydraulic operating device is provided for a human-powered vehicle in which the hydraulic operating device basically comprises a base, an operating member and a handlebar mounting structure. The base includes a cylinder bore defining a cylinder axis and a hydraulic reservoir connected to the cylinder bore. The operating member is pivotally coupled to the base about a pivot axis between a rest position and an operated position. The handlebar mounting structure is coupled to the base. The handlebar mounting structure defines a handlebar mounting axis that extends linearly along a handlebar in a mounted state in which the base is mounted to the handlebar by the handlebar mounting structure. The cylinder axis of the cylinder bore is inclined towards the handlebar mounting axis as the cylinder bore extends away from the pivot axis as viewed in a pivot axis direction parallel to the pivot axis. The hydraulic reservoir is offset from the handlebar mounting structure as viewed in the pivot axis direction.

With the hydraulic operating device according to the third aspect, it is possible to provide the hydraulic operating device with a relatively compact profile with respect to the handlebar mounting axis.

In accordance with a fourth aspect of the present disclosure, the hydraulic operating device according to any one of the first to third aspects is configured so that the hydraulic reservoir is disposed above the cylinder bore while in the mounted state.

With the hydraulic operating device according to the fourth aspect, it is possible to ensure that the hydraulic reservoir is reliably provided from the hydraulic reservoir to the cylinder bore.

In accordance with a fifth aspect of the present disclosure, the hydraulic operating device according to any one of the first to fourth aspects is configured so that the cylinder axis and the handlebar mounting axis form an inclination angle in a range from one degrees to twenty-five degrees.

With the hydraulic operating device according to the fifth aspect, it is possible to provide the hydraulic operating device with a relatively compact profile with respect to the handlebar mounting axis.

In accordance with a sixth aspect of the present disclosure, the hydraulic operating device according to the fifth aspect is configured so that the inclination angle is in a range from five degrees to fifteen degrees.

With the hydraulic operating device according to the sixth aspect, it is possible to provide the hydraulic operating device with an even more relatively compact profile with respect to the handlebar mounting axis.

In accordance with a seventh aspect of the present disclosure, the hydraulic operating device according to any one of the first to sixth aspects further comprises a piston movably provided in the cylinder bore.

With the hydraulic operating device according to the seventh aspect, it is possible to easily pressurize the hydraulic fluid in the cylinder bore.

In accordance with an eighth aspect of the present disclosure, the hydraulic operating device according to the seventh aspect is configured so that the piston is coupled to the operating member to be pulled in response to a pivotal movement of the operating member from the rest position to the operated position.

With the hydraulic operating device according to the eighth aspect, it is possible to effectively transmit the operating force to the piston using the operating member.

In accordance with a ninth aspect of the present disclosure, the hydraulic operating device according to the seventh or eighth aspect further comprises a piston position adjustment operatively coupled to the piston.

With the hydraulic operating device according to the ninth aspect, it is possible to adjust an initial resting position of the piston relative to the base in accordance with usage conditions of the hydraulic operating device.

In accordance with a tenth aspect of the present disclosure, the hydraulic operating device according to any one of the first to ninth aspects is configured so that the operating member further includes an operating member position adjustment.

With the hydraulic operating device according to the tenth aspect, it is possible to adjust an initial resting position of the operating member relative to the base in accordance with usage conditions of the hydraulic operating device.

In accordance with an eleventh aspect of the present disclosure, the hydraulic operating device according to any one of the first to tenth aspects is configured so that the base includes a hose attachment port disposed on one of a downwardly facing side and a rearwardly facing side of the base while in the mounted state.

With the hydraulic operating device according to the eleventh aspect, it is possible to hide a connection between the hose attachment port and a hydraulic hose.

In accordance with a twelfth aspect of the present disclosure, the hydraulic operating device according to the eleventh aspect is configured so that the hose attachment port is located in a ninety degree range with respect to the cylinder axis of the cylinder bore. The ninety degree range extends from a plane that is perpendicular to the pivot axis and that includes the cylinder axis to a plane that is parallel to the pivot axis and that includes the cylinder axis.

With the hydraulic operating device according to the twelfth aspect, it is possible to ensure that a hydraulic hose connected to the hose attachment port does not extend too far away from the handlebar.

In accordance with a thirteenth aspect of the present disclosure, the hydraulic operating device according to the eleventh or twelfth aspect is configured so that the hose attachment port has a center port axis that is not parallel to the pivot axis.

With the hydraulic operating device according to the thirteenth aspect, it is possible to ensure that a hydraulic hose connected to the hose attachment port can be effectively routed.

In accordance with a fourteenth aspect of the present disclosure, the hydraulic operating device according to any one of the first to thirteenth aspects is configured so that the operating member includes an operating lever.

With the hydraulic operating device according to the fourteenth aspect, it is possible to easily operate the operating member from the handlebar.

In accordance with a fifteenth aspect of the present disclosure, the hydraulic operating device according to the fourteenth aspect is configured so that the operating lever has a user contact surface that is not parallel to the cylinder axis.

With the hydraulic operating device according to the fifteenth aspect, it is possible to easily operate the operating member from the handlebar.

In accordance with a sixteenth aspect of the present disclosure, the hydraulic operating device according to any one of the first to fifteenth aspects is configured so that a linear distance between the pivot axis and the handlebar mounting axis as viewed in the pivot axis direction is in a range from fifteen millimeters to thirty millimeters.

With the hydraulic operating device according to the sixteenth aspect, it is possible to provide the hydraulic operating device with a relatively compact profile with respect to the handlebar mounting axis.

In accordance with a seventeenth aspect of the present disclosure, the hydraulic operating device according to any one of the first to sixteenth aspects is configured so that a linear distance between the pivot axis and the cylinder axis as viewed in the pivot axis direction is in a range from three millimeters to fifteen millimeters.

With the hydraulic operating device according to the seventeenth aspect, it is possible to provide the hydraulic operating device with a relatively compact profile with respect to the handlebar mounting axis.

In accordance with an eighteenth aspect of the present disclosure, the hydraulic operating device according to the seventh aspect is configured so that the piston is coupled to the operating member to be pushed in response to a pivotal movement of the operating member from the rest position to the operated position.

With the hydraulic operating device according to the eighteenth aspect, it is possible to provide a push type hydraulic operating device with a relatively compact profile with respect to the handlebar mounting axis.

In accordance with a nineteenth aspect of the present disclosure, the hydraulic operating device according to the eighteenth aspect further comprises a torque transmission mechanism operatively connecting the piston and the operating member to push the piston at a non-constant actuation ratio of a movement of the operating member to a movement of the piston.

With the hydraulic operating device according to the nineteenth aspect, it is possible to provide move that piston at a different rate while the operating member remains at a constant rate.

In accordance with a twentieth aspect of the present disclosure, the hydraulic operating device according to the nineteenth aspect is configured so that the torque transmission mechanism is configured to move the piston at a first actuation ratio with respect to a movement amount of the operating member during a beginning section of the movement of the operating member and to move the piston at a second actuation ratio with respect to the movement amount of the operating member during a subsequent section of the movement of the operating member. The first actuation ratio is larger than the second actuation ratio.

With the hydraulic operating device according to the twentieth aspect, it is possible to initially move the piston faster rate at the beginning movement of the operating member as compared to a subsequent movement of the operating member when the movement rate of the operating member remains constant.

In accordance with a twenty-first aspect of the present disclosure, the hydraulic operating device according to any one of the eighteenth to twentieth aspects further comprises a connecting rod and a cam guide. The connecting rod is operatively connected between the piston and the operating member. The cam guide supports the connecting rod to the base. The cam guide is shaped to control movement of the piston at a non-constant actuation ratio of a movement of the operating member to a movement of the piston.

With the hydraulic operating device according to the twenty-first aspect, it is possible to easily control movement of the piston at the desired actuation ratio.

In accordance with a twenty-second aspect of the present disclosure, the hydraulic operating device according to the twenty-first aspect is configured so that a first torque transmission member movably mounted to the base, and a second torque transmission member movably mounted to the base. The first torque transmission member has a first contact portion configured to receive an input torque from the operating member and a second contact portion configured to transmit the input torque to the second torque transmission member. The second torque transmission member has a third contact portion configured to receive a transmitted torque from the first torque transmission member and a fourth contact portion configured to transmit the transmitted torque to the connecting rod.

With the hydraulic operating device according to the twenty-second aspect, it is possible to transmit the torque from the operating member to the piston such that the piston is pushed in response to operation of the operating member.

In accordance with a twenty-third aspect of the present disclosure, the hydraulic operating device according to the twenty-second aspect is configured so that the first torque transmission member is pivotally coupled to the base, and the second torque transmission member is pivotally coupled to the base.

With the hydraulic operating device according to the twenty-third aspect, it is possible to easily mount the first and second torque transmission members to the base.

In accordance with a twenty-fourth aspect of the present disclosure, the hydraulic operating device according to the twenty-first aspect is configured so that the first torque transmission member is pivotally coupled to the base about the pivot axis, and the second torque transmission member is pivotally coupled to the base about an additional pivot axis different from the pivot axis.

With the hydraulic operating device according to the twenty-fourth aspect, it is possible to effectively transfer the torque from the operating member to the piston.

Also, other objects, features, aspects and advantages of the disclosed hydraulic operating device will become apparent to those skilled in the art from the following detailed description, which, taken in conjunction with the annexed drawings, discloses preferred embodiments of the hydraulic operating device.

BRIEF DESCRIPTION OF THE DRAWINGS

Referring now to the attached drawings which form a part of this original disclosure:

FIG. 5 is a first end elevational view of the hydraulic operating device illustrated in FIGS. 1 to 4 in which the handlebar shown in cross section;

FIG. 6 is a second end elevational view of the hydraulic operating device illustrated in FIGS. 1 to 5 in which the handlebar shown in cross section;

FIG. 7 is a rear side elevational view of the hydraulic operating device illustrated in FIGS. 1 to 6;

FIG. 8 is a rear side elevational view, similar to FIG. 7, of the hydraulic operating device illustrated in FIGS. 1 to 7 but with the clamp removed;

FIG. 9 is a top view, similar to FIG. 2, of the portion of the handlebar and the hydraulic operating device illustrated in FIGS. 1 to 7, but in which a handlebar mounting structure of the hydraulic operating device has been adjusted with respect to the base of the hydraulic operating device;

FIG. 13 is an end elevational view, similar to FIG. 4 of the hydraulic operating device illustrated in FIGS. 1 to 7 in which the handlebar mounting structure of the hydraulic operating device is shown in cross section;

FIG. 14 is a cross-sectional view of the base of the hydraulic operating device illustrated in FIGS. 1 to 7 taken along section line 14-14 of FIG. 4;

FIG. 15 is a cross-sectional view of the base of the hydraulic operating device illustrated in FIGS. 1 to 7 taken along section line 15-15 of FIG. 4;

FIG. 16 is a cross-sectional view of the base of the hydraulic operating device illustrated in FIGS. 1 to 7 taken along section line 16-16 of FIG. 4;

FIG. 17 is a top view of the portion of the handlebar and the hydraulic operating device illustrated in FIGS. 1 to 7, but in which another device has been attached to the handlebar mounting structure of the hydraulic operating device;

FIG. 27 is a partial enlarged cross-sectional view of the portion of the hydraulic operating device illustrated in FIG. 26;

FIG. 28 is a partial bottom view of the portion of the hydraulic operating device illustrated in FIG. 27;

DETAILED DESCRIPTION OF EMBODIMENTS

Selected embodiments will now be explained with reference to the drawings. It will be apparent to those skilled in the human-powered vehicle field from this disclosure that the following descriptions of the embodiments are provided for illustration only and not for the purpose of limiting the invention as defined by the appended claims and their equivalents.

Referring initially to FIGS. 1 to 4, an operating device 10 is provided for a human-powered vehicle V in accordance with a first illustrative embodiment. Here, in the illustrated embodiments, the operating device 10 is a hydraulic operating device that is provided for the human-powered vehicle V. The operating device 10 is mounted to a handlebar H of the human-powered vehicle V. Here, the human-powered vehicle V is preferably a bicycle. Thus, the operating device 10 is a bicycle hydraulic brake operating device. Hereinafter, the operating device 10 is consistently referred as the hydraulic operating device 10.

Figure 1:
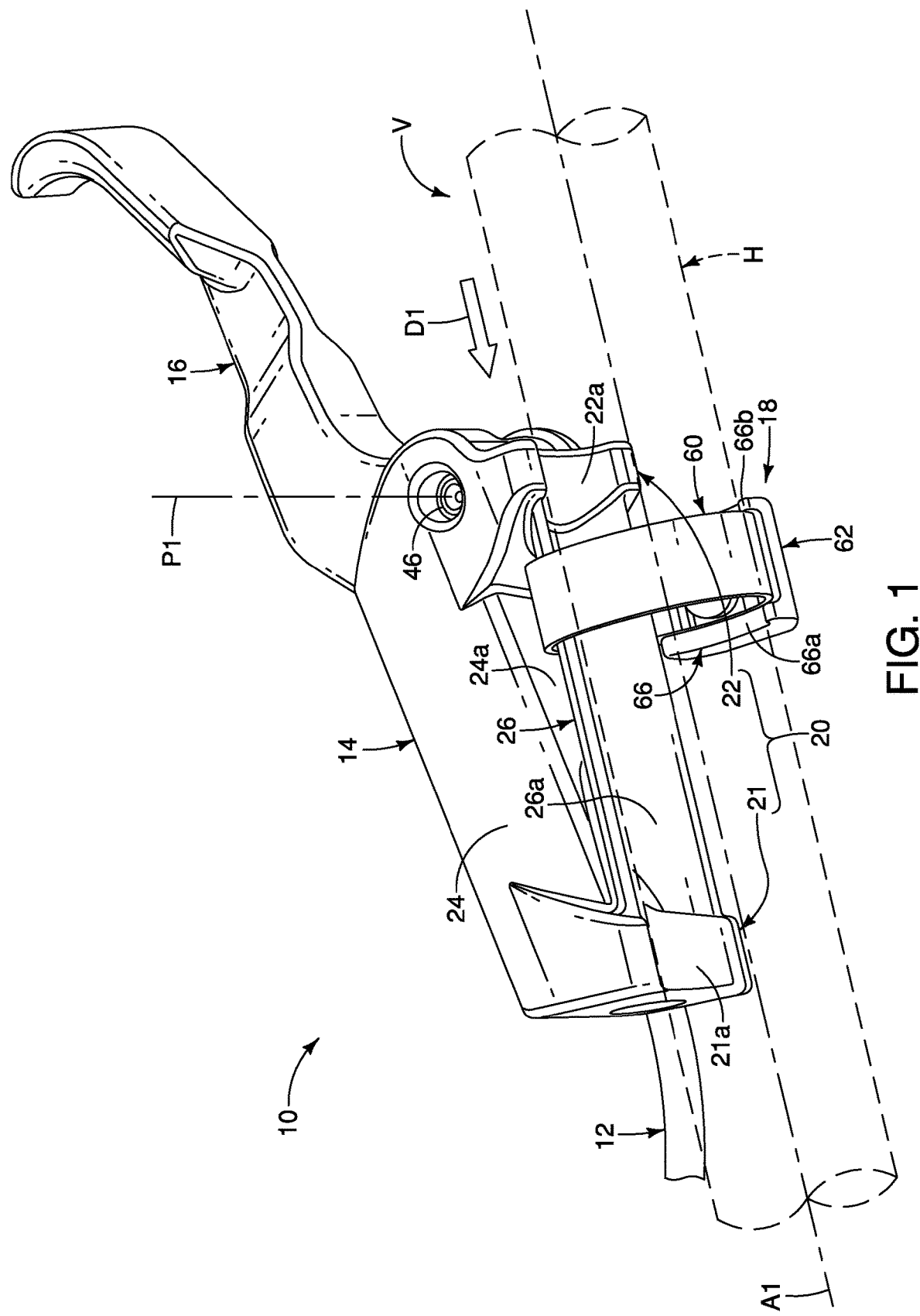
FIG. 1 is a top perspective view of a portion of a handlebar of a human-powered vehicle that is equipped with a hydraulic operating device in accordance with a first embodiment.
Figure 2:
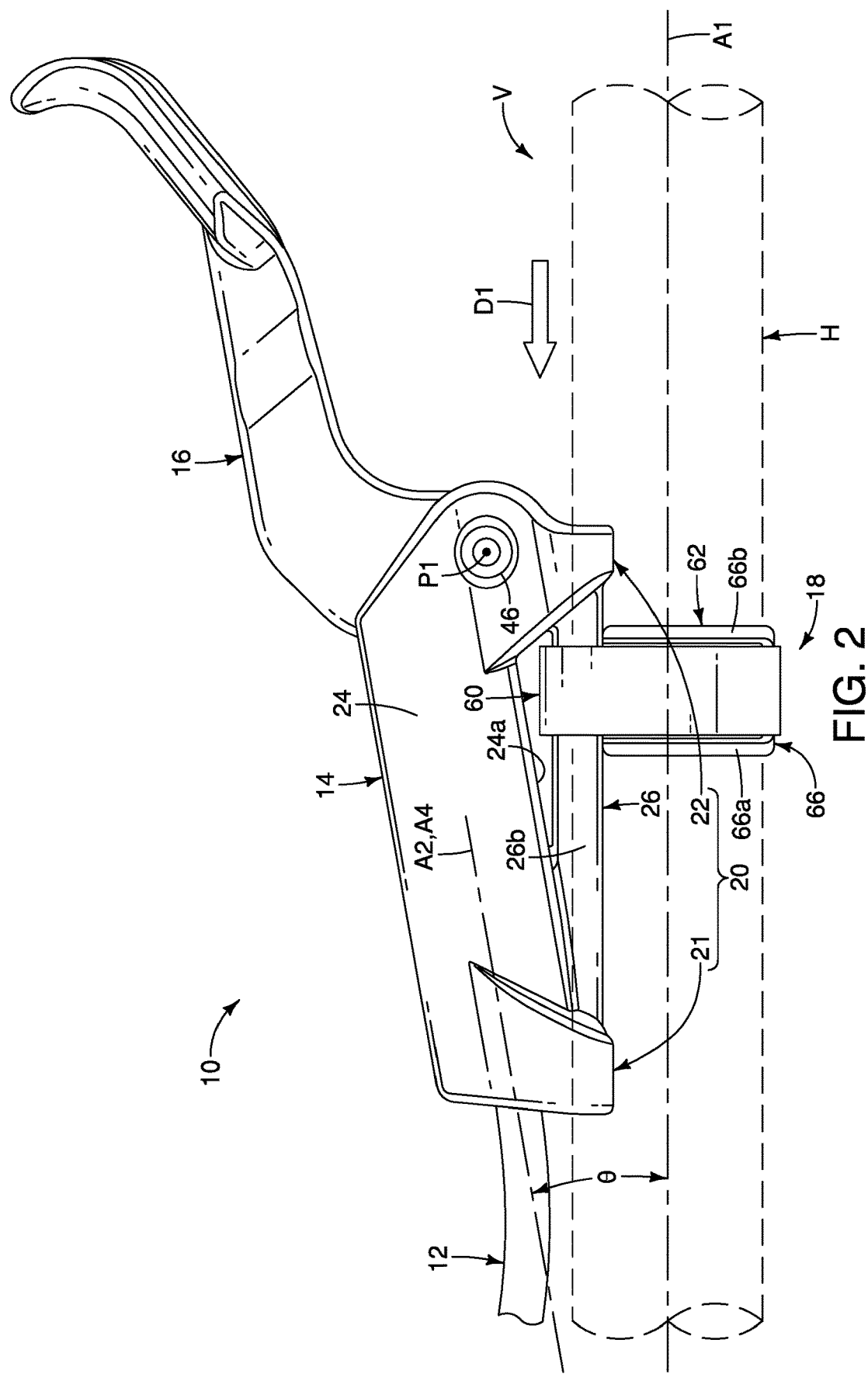
FIG. 2 is a top view of the portion of the handlebar and the hydraulic operating device illustrated in FIG. 1 in which an operating member (an operating lever) is in a rest position.
Figure 3:
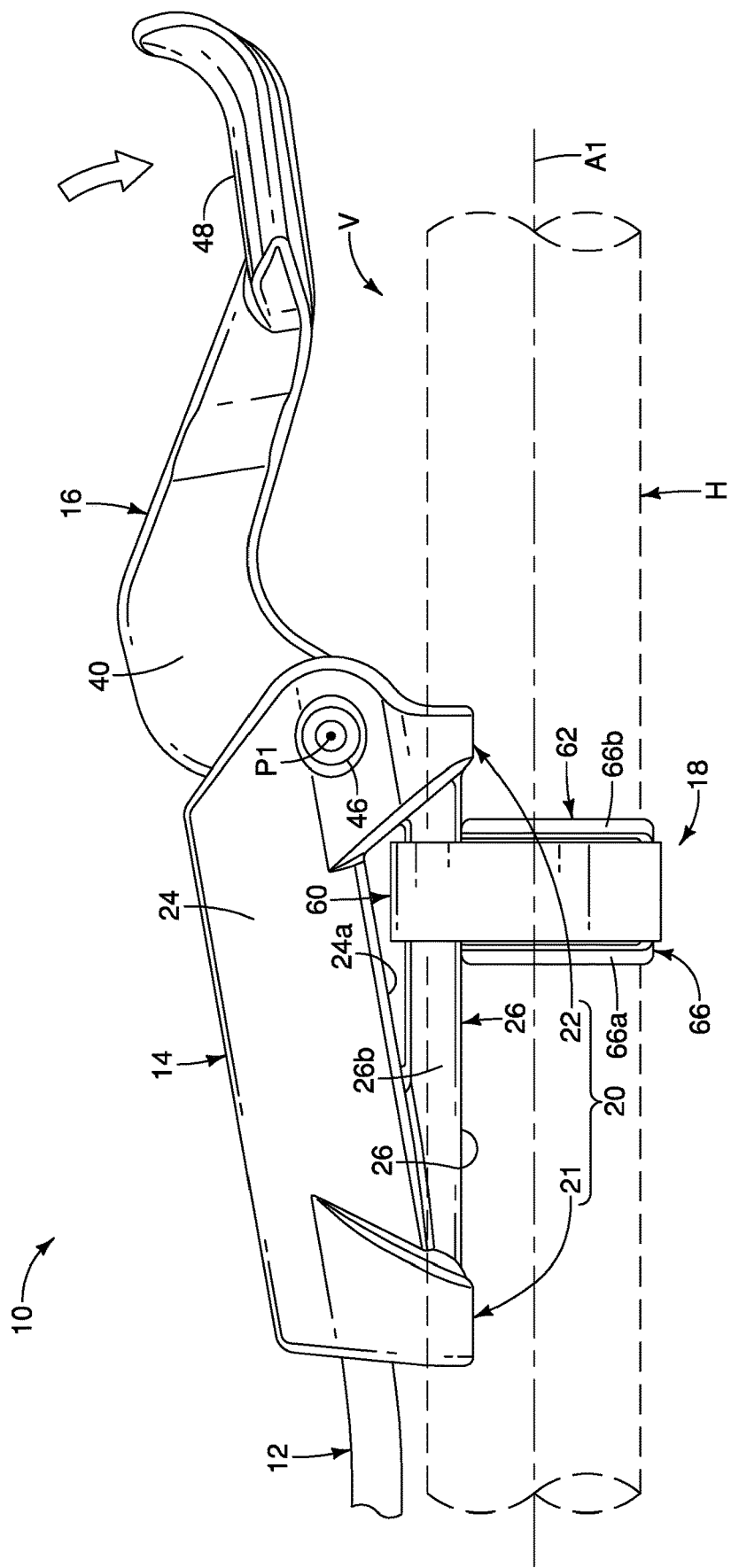
FIG. 3 is a top view of the portion of the handlebar and the hydraulic operating device illustrated in FIGS. 1 and 2, but in which the operating member has been moved to an actuated position.

The hydraulic operating device 10 is fluidly connected to a hydraulic operated device (not shown) by a hydraulic hose 12. As illustrated in FIGS. 1 to 3, the hydraulic operating device 10 is a right-hand side hydraulic brake actuating device that is operated by the rider's right hand from a rest or non-operated position (FIGS. 1 and 2) to an operated position (FIG. 3) for actuating the hydraulic operated device such as a disc brake caliper. It will be apparent to those skilled in the bicycle field that the configuration of the hydraulic operating device 10 can be adapted to a left-hand side hydraulic brake actuating device that is operated by the rider's left hand. Also, the hydraulic operating device 10 can be used with other vehicle components other than a disc brake caliper.

The hydraulic operating device 10 basically comprises a base 14, an operating member 16 and a handlebar mounting structure 18. Here, the handlebar mounting structure 18 is adjustably coupled to the base 14. As explained below, the handlebar mounting structure 18 is adjustably mounted to the base 14 in an axial direction D1 (indicated by the symbol "⊗" in FIGS. 5 and 6) that is parallel to a handlebar mounting axis A1 by loosening the handlebar mounting structure 18 and then re-tightening the handlebar mounting structure 18. Also, as explained below, the handlebar mounting structure 18 is adjustably coupled to the base 14 around the handlebar mounting axis A1 by loosening the handlebar mounting structure 18 and then re-tightening the handlebar mounting structure 18.

Figure 10:
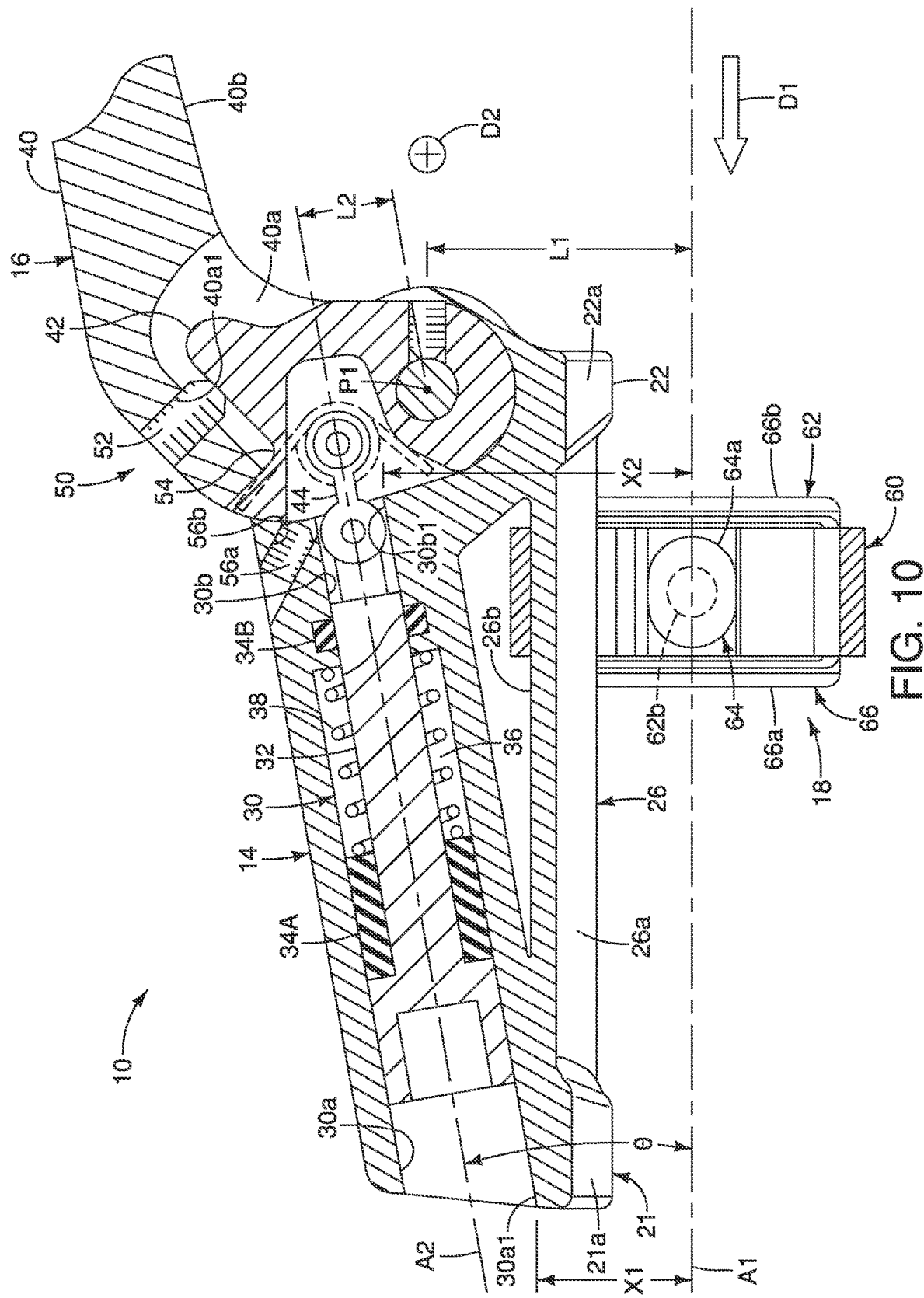
FIG. 10 is a cross-sectional view of the hydraulic operating device illustrated in FIGS. 1 to 7 as taken along section plane perpendicular to a pivot axis of the operating member of the hydraulic operating device and passing through a cylinder axis of a cylinder bore provided in a base of the hydraulic operating device.
Figure 11:
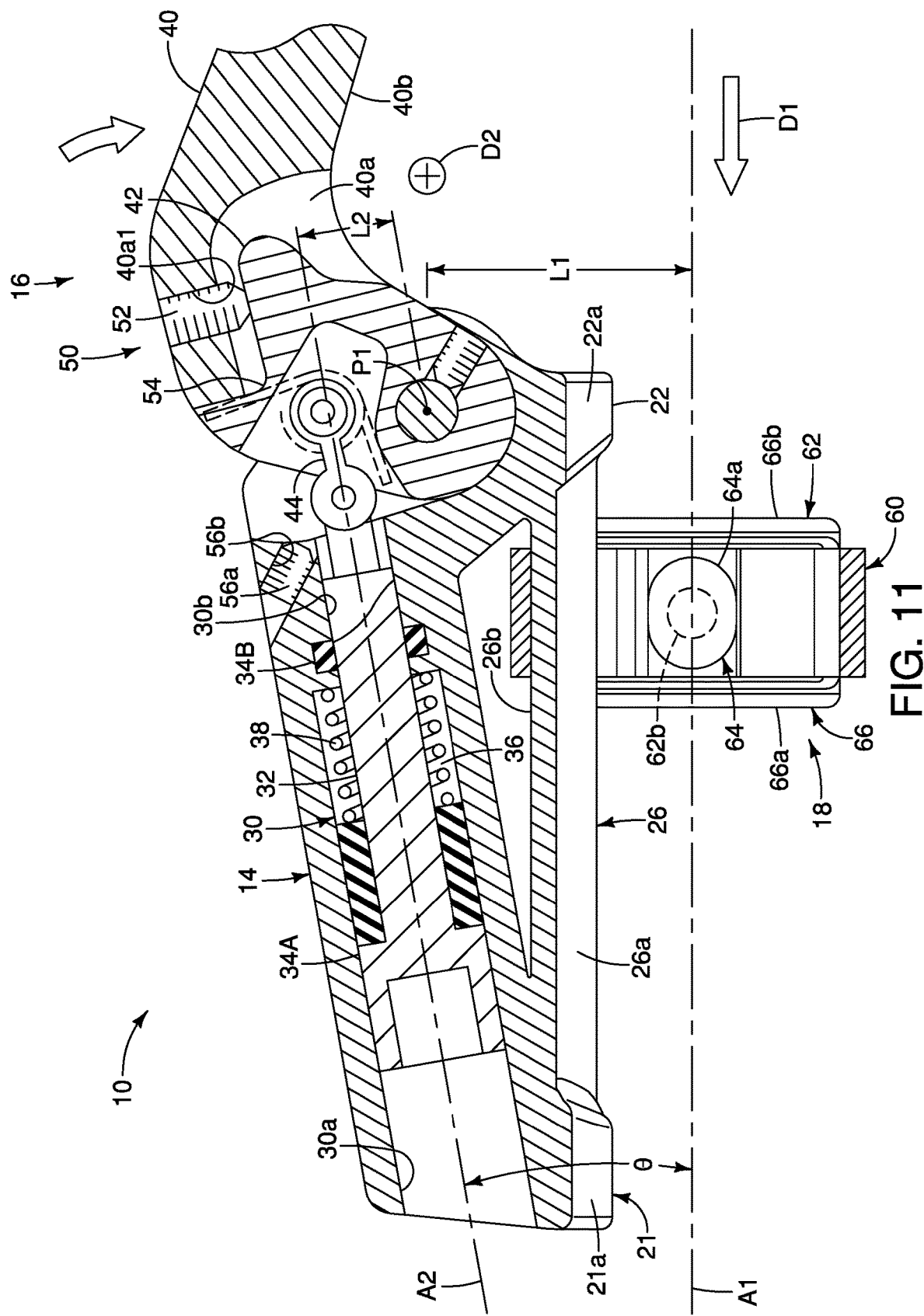
FIG. 11 is a cross-sectional view, similar to FIG. 10, of the hydraulic operating device illustrated in FIGS. 1 to 7, but in which the operating member has been moved to an actuated position.

The operating member 16 is pivotally coupled to the base 14 about a pivot axis P1 between a rest position (see FIGS. 1, 2 and 4 to 10) and an operated position (see FIGS. 3 and 11). Here, as seen in FIGS. 10 and 11, the pivot axis P1 of the operating member 16 is located in an area between a cylinder axis A2 and the handlebar mounting axis A1 as viewed in a pivot axis direction D2, which is parallel to the pivot axis P1. The pivot axis direction D2 is indicated by the symbol "⊗" in FIGS. 4 and 10 to 12. Preferably, as seen in FIGS. 10 and 11, a linear distance L1 (shortest distance) between the pivot axis P1 and the handlebar mounting axis A1 as viewed in the pivot axis direction D2 is in a range from fifteen millimeters to thirty millimeters. Here, in the first embodiment, the linear distance L1 is twenty-one millimeters.

In the first embodiment, as mentioned above, the hydraulic operating device 10 is mounted to the handlebar (bicycle handlebar) H by the handlebar mounting structure 18 as seen in FIGS. 1 to 6. In particular, the handlebar mounting structure 18 is coupled to the base 14. The handlebar mounting structure 18 defines the handlebar mounting axis A1 that extends linearly along the handlebar H in a mounted state in which the base 14 is mounted to the handlebar H by the handlebar mounting structure 18. The handlebar mounting axis A1 substantially coincides with a longitudinal center axis of the handlebar H in the mounting state.

The base 14 includes a handlebar contact portion 20. The handlebar contact portion 20 is configured to contact the handlebar H in a mounted state in which the base 14 is mounted to the handlebar H by the handlebar mounting structure 18. The handlebar contact portion 20 is spaced from the handlebar mounting structure 18 in an axial direction D1 that is parallel to the handlebar mounting axis A1. In the first embodiment, the handlebar contact portion 20 has a first handlebar abutment 21 and a second handlebar abutment 22. The second handlebar abutment 22 is separated and spaced from the first handlebar abutment 21 in the axial direction D1 that is parallel to the handlebar mounting axis A1. Preferably, in the first embodiment, the handlebar mounting structure 18 is arranged between the first handlebar abutment 21 and the second handlebar abutment 22. In the first embodiment, the base 14 includes a main body 24. The first handlebar abutment 21 and the second handlebar abutment 22 are integrally formed with the main body 24. The main body 24 includes a non-handlebar contact portion 24a that extends between the first and second handlebar abutments 21 and 22 such that the second handlebar abutment 22 is separated and spaced from the first handlebar abutment 21 by the non-handlebar contact portion 24a.

Preferably, in the first embodiment, the first handlebar abutment 21 has a first curved handlebar abutment surface 21a, and the second handlebar abutment 22 has a second curved handlebar abutment surface 22a. The second curved handlebar abutment surface 22a is separated and spaced from the first curved handlebar contact surface 21a. The curvatures of the first and second curved handlebar abutment surfaces 21a and 22a are the same in the first embodiment. Preferably, the curvatures of the first and second curved handlebar abutment surfaces 21a and 22a are substantially the same as the curvature of the handlebar H or slightly larger than the curvature of the handlebar H. In this way, the first and second curved handlebar abutment surfaces 21a and 22a can firmly contact the handlebar H at two locations when the hydraulic operating device 10 is in a mounted state in which the base 14 is mounted to the handlebar H by the handlebar mounting structure 18.

Here, as seen in FIGS. 9 to 11, the base 14 has a guide 26 that extends in the axial direction D1. The guide 26 is integrally formed with the main body 24 and extends between the first and second handlebar abutments 21 and 22. Thus, the guide 26 is located between the first handlebar abutment 21 and the second handlebar abutment 22. The handlebar mounting structure 18 is adjustably coupled to the guide 26 in the axial direction D1 that is parallel to the handlebar mounting axis A1. The guide 26 has a convex surface 26a and a concave surface 26b. The convex surface 26a is engaged by the handlebar mounting structure 18 when the handlebar mounting structure 18 attaches the base 14 to the handlebar H. In the mounted state in which the base 14 is mounted to the handlebar H by the handlebar mounting structure 18, the concave surface 26b faces the handlebar H but does not contact the handlebar H. In particular, the concave surface 26b is offset away from the first and second curved handlebar abutment surfaces 21a and 22a such that a gap is formed between the handlebar H and the concave surface 26b while the hydraulic operating device 10 is mounted to the handlebar H. In this way, the guide 26 also forms a non-handlebar contact portion of the base 14.

As mentioned above, in the illustrated embodiments, the hydraulic operating device 10 is a hydraulic operating device. In such a case, as seen in FIGS. 10 and 11, the base 14 including a cylinder bore 30 that defines the cylinder axis A2. The hydraulic operating device 10 further comprises a piston 32 that is movably provided in the cylinder bore 30. The cylinder bore 30 is provided in the main body 24 of the base 14. Preferably, a linear distance L2 (FIGS. 10 and 12) between the pivot axis P1 and the cylinder axis A2 as viewed in the pivot axis direction D2 is in a range from three millimeters to fifteen millimeters. Here, in the first embodiment, the linear distance (shortest distance) L2 is seven and one-half millimeters.

Here, the cylinder axis A2 extends non-perpendicularly with respect to the handlebar mounting axis A1 as viewed in the pivot axis direction D2 that is parallel to the pivot axis P1 of the operating member 16. Also, the cylinder axis A2 is not parallel to the handlebar mounting axis A1 of the handlebar arrangement area A as viewed in the pivot axis direction D2. The cylinder axis A2 of the cylinder bore 30 is inclined towards the handlebar mounting axis A1 as the cylinder bore 30 extends away from the pivot axis as viewed in the pivot axis direction D2 parallel to the pivot axis P1. In other words, the cylinder axis A2 diverges away from the handlebar mounting axis A1 in an actuation direction of the piston 32 (i.e., a right side direction in the illustrated embodiment). Preferably, as in the first embodiment, the cylinder axis A2 and the handlebar mounting axis A1 form an inclination angle θ in a range from one degrees to twenty-five degrees. More preferably, the inclination angle θ is in a range from five degrees to fifteen degrees. In the first embodiment, the inclination angle θ is ten degrees As mentioned above, the piston 32 is movably provided in the cylinder bore 30. The cylinder bore 30 has a first cylindrical portion 30a and a second cylindrical portion 30b. The first cylindrical portion 30a includes a first end 30a1 of the cylinder bore 30. The second cylindrical portion 30b includes a second end 30b1 of the cylinder bore 30. Therefore, the cylinder bore 30 includes the first end 30a1. The cylinder bore 30 includes the second end 30b1 that is spaced from the first end 30a1 along the cylinder axis A2. As seen in FIG. 10, a first distance X1 between the first end 30a1 of the cylinder bore 30 and the handlebar mounting axis A1 is smaller than a second distance X2 between the second end 30b1 of the cylinder bore 30 and the handlebar mounting axis A1. Therefore, the first distance X1 is spaced farther away from the pivot axis P1 than the second distance X2 is spaced from the pivot axis P1. The first cylindrical portion 30a is larger in diameter than the second cylindrical portion 30b. The piston 32 is inserted into the cylinder bore 30 from an open end of the first cylindrical portion 30a. The piston 32 is provided with a first annular sealing ring 34A and a second annular sealing ring 34B. The first annular sealing ring 34A is provided on the piston 32 for sealing off the open end of the first cylindrical portion 30a of the cylinder bore 30. The second annular sealing ring 34B is provided on the base 14 for sealing off the open end of the second cylindrical portion 30b of the cylinder bore 30. The first and second annular sealing rings 34A and 34B are preferably elastomeric (e.g., rubber) O-rings that have uniform cross sectional profiles. The first annular sealing ring 34A slidably contacts an internal surface of the first cylindrical portion 30a of the cylinder bore 30. The second annular sealing ring 34B slidably contacts the piston 32. The cylinder bore 30 and the first and second annular sealing rings 34A and 34B of the piston 32 defines a hydraulic pressure chamber 36 that changes in size in response to the operation of the operating member 16. The hydraulic pressure chamber 36 is filled with a hydraulic fluid such as a mineral oil.

A biasing element 38 is disposed in the cylinder bore 30, and biases the piston 32 to a non-actuated (rest or non-operated) position. Here, the biasing element 38 is a coil compression spring that biases the piston 32 to the non-actuated position. The biasing element 38 also biases the operating member 16 to its rest position (i.e., no external force applied to the operating member 16). Thus, the piston 32 compresses the biasing element 38 as the piston 32 moves in the cylinder bore 30 in response to an operation of the operating member 16.

The piston 32 is operatively coupled to the operating member 16 to move the piston 32 within the cylinder bore 30 in response to operation of the operating member 16. Namely, as seen in FIG. 11, the piston 32 is coupled to the operating member 16 to be pulled in response to a pivotal movement of the operating member 16 from the rest position to the operated position. The piston 32 moves linearly along the cylinder axis A2 within the cylinder bore 30 in response to operation of the operating member 16.

Referring to FIGS. 10 and 11, the operating member 16 includes an operating lever 40. Preferably, the operating member 16 further includes an actuator 42 and a connecting link 44. Here, the operating lever 40 and the actuator 42 are pivotally mounted relative to the base 14 by a pivot pin 46 from the rest (non-operated) position (FIG. 10) to the operated position (FIG. 11). The connecting link 44 operatively couples the piston 32 to the operating lever 40 and the actuator 42. Here, the connecting link 44 has a first end pivotally connected to the actuator 42 and a second end pivotally connected to the piston 32. In this way, the piston 32 is operatively coupled to the operating lever 40. However, the piston 32 can be operatively coupled to the operating lever 40 in other ways.

The operating lever 40 includes a mounting portion 40a and a lever portion 40b as seen in FIGS. 10 and 11. The mounting portion 40a of the operating lever 40 is pivotally mounted relative to the base 14 by the pivot pin 46. The lever portion 40b of the operating lever 40 extends from the mounting portion 40a to a distal free end 40c of the operating lever 40.

As seen in FIGS. 15 and 16, the lever portion 40b of the operating lever 40 has a user contact surface 48. The user contact surface 48 is elongated in a direction D3 that is not parallel to a plane PL1 that is perpendicular to the pivot axis P1 and that includes the cylinder axis A2. More specifically, the lever portion 40b of the operating lever 40 has a connecting section 40b1 and a user contact section 40b2 (FIG. 9). The connecting section 40b1 extends directly between the mounting portion 40a (FIG. 10) and the user contact section 40b2 of the lever portion 40b. The user contact section 40b2 includes the user contact surface 48, which extends from the connecting section 40b1 to the distal free end 40c. The connecting section 40b1 is elongated in a direction parallel to the plane PL1. Thus, the user contact section 40b2 is angled with respect to the connecting section 40b1. Here, the user contact section 40b2 is angled downward with respect to the connecting section 40b1 when the hydraulic operating device 10 is in a mounted state in which the base 14 is mounted to the handlebar H by the handlebar mounting structure 18. Thus, the user contact surface 40b1 is not parallel to the cylinder axis A2.

Referring to FIGS. 10 and 11, the operating member 16 further includes an operating member position adjustment 50. The operating member position adjustment 50 is also called a reach adjustment. In other words, the operating member position adjustment 50 adjusts the rest position or non-actuated position of the operating lever 40 relative to the base 14. In this way, the distance or reach between the user contact surface 48 of the operating lever 40 and the handlebar H can be adjusted. Basically, the operating member position adjustment 50 changes a relative position between the operating lever 40 and the actuator 42.

The operating member position adjustment 50 includes an adjustment member 52 and a biasing element 54. Here, in the first embodiment, the adjustment member 52 is a set screw that is threaded into a threaded bore 40a1 of the mounting portion 40a of the operating lever 40. The biasing element 54 is a torsion spring having a coiled portion mounted on a pivot pin of the connecting link 44. A first leg of the biasing element 54 contacts the mounting portion 40a of the operating lever 40 and a second of the biasing element 54 contacts the actuator 42. In this way, the biasing element 54 applies a biasing force between the mounting portion 40a of the operating lever 40 and the actuator 42 forcing the adjustment member 52 (e.g., the set screw) against the actuator 42. As a result of the biasing force of the biasing element 54, the operating lever 40 and the actuator 42 move as a rigid unit when the operating lever 40 is operated from the rest position to the operated position. If the operating member position adjustment 50 is not used, then the actuator 42 can be omitted and the operating lever 40 is connected to the connecting link 44.

Also, referring to FIGS. 10 and 11, the hydraulic operating device 10 further comprises a piston position adjustment 56 that is operatively coupled to the piston 32. Here, the piston position adjustment 56 includes a piston adjustment member 56a rotatably attached to the base 14. The piston position adjustment 56 further includes a threaded hole 56b formed in the base 14. Here, the piston adjustment member 56a is a set screw having an external thread threadedly engaged with an internal thread of the threaded hole 56b. The piston adjustment member 56a is in contact with the actuator 42. In particular, the actuator 42 is pressed against the piston adjustment member 56a by the biasing element 38. The tip end of the piston adjustment member 56a acts as an adjustable stop for the actuator 42 of the operating lever 40. Rotation of the piston adjustment member 56a pivots the actuator 42 relative to the base 14 about the pivot axis P1. This adjustment changes the initial position of the piston 32 relative to the base 14. This adjustment also changes the rest position of the operating member 16 relative to the base 14 since the piston 32 is connected to the operating lever 40 by the connecting link 44. Alternatively, the piston adjustment member 56a can be arranged to press directly against the piston 32.

As seen in FIG. 13, the handlebar mounting structure 18 includes a clamp band 60, a bracket 62 and a tightening member 64. The clamp band 60 is preferably a metal strap that is bent into an annular member. The clamp band 60 is looped around the guide 26. The tightening member 64 adjustably couples the bracket 62 relative to the clamp band 60. The bracket 62 is moved relative to the clamp band 60 upon adjustment of the tightening member 64. In other words, the tightening member 64 is tightened and loosened to move the bracket 62 relative to the clamp band 60. The bracket 62 is separate from the base 14.

Figure 4:
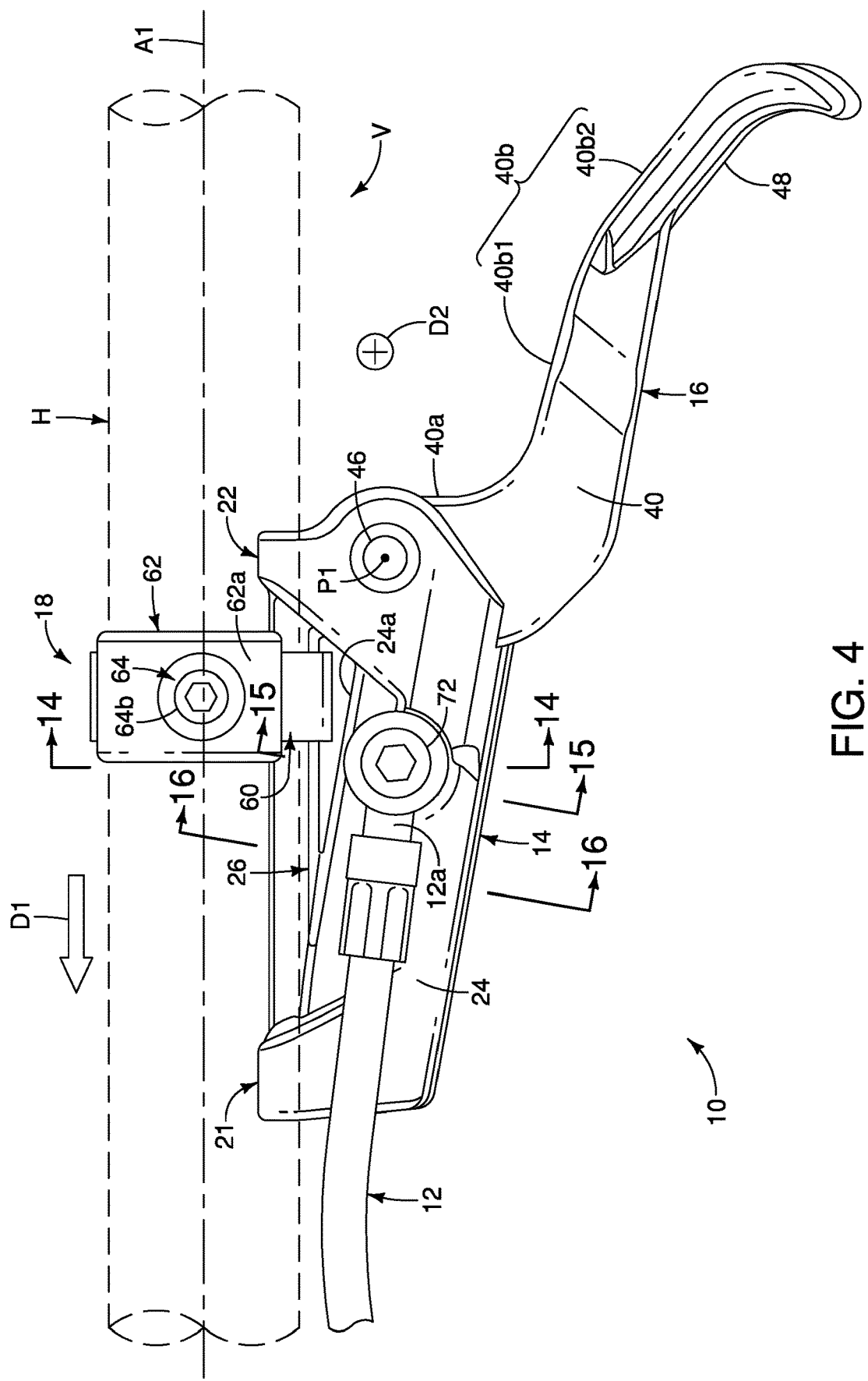
FIG. 4 is a bottom plan view of the portion of the handlebar and the hydraulic operating device illustrated in FIGS. 1 to 3.
Figure 12:
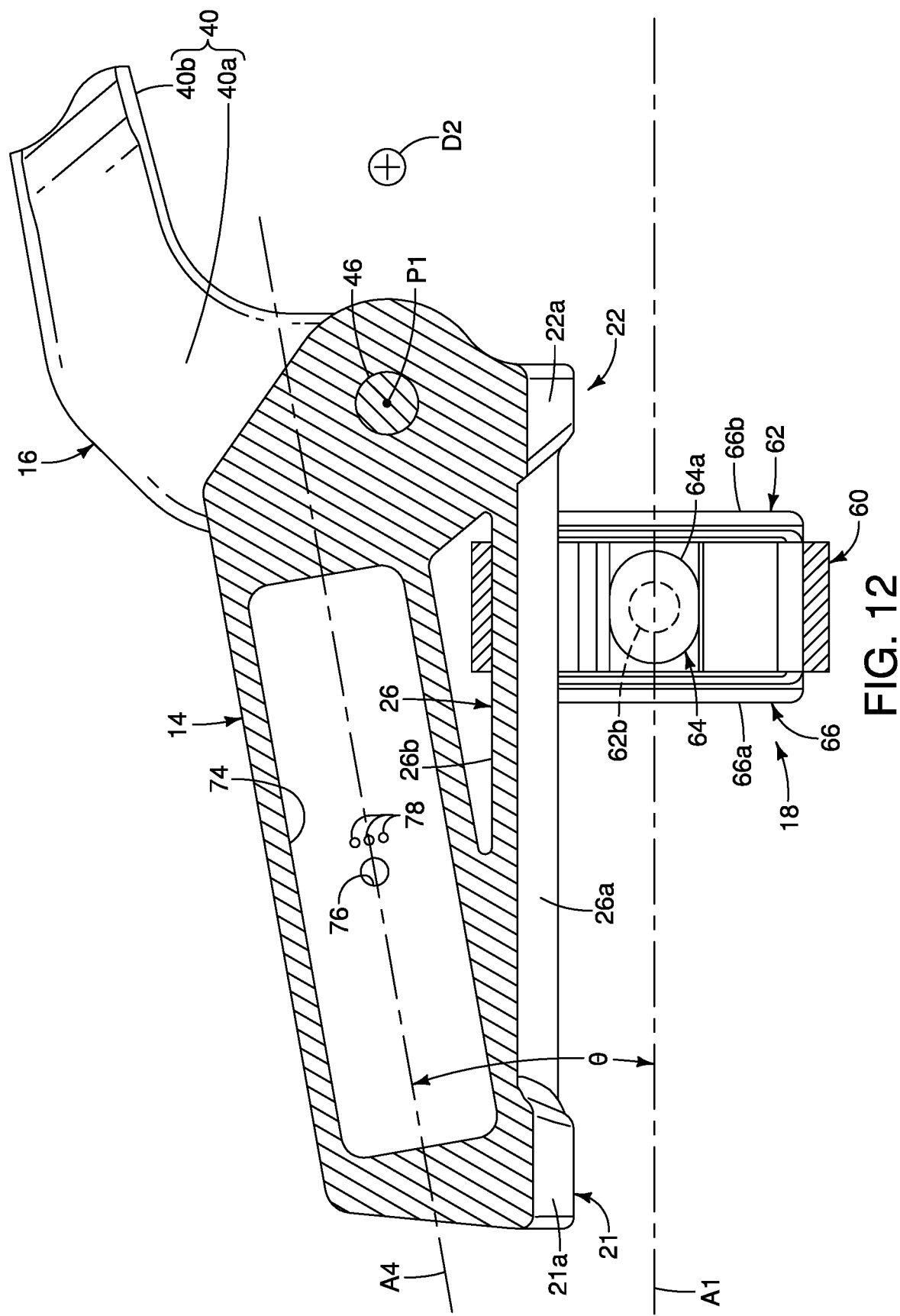
FIG. 12 is a cross-sectional view of the hydraulic operating device illustrated in FIGS. 1 to 7 as taken along section plane perpendicular to the pivot axis of the operating member of the hydraulic operating device and passing through a hydraulic reservoir of the hydraulic operating device.

The bracket 62 is rigid member made of a suitable material such as a metallic material or a hard-plastic material. The bracket 62 has a handlebar contact surface 66. The handlebar contact surface 66 is configured to contact the handlebar H when the tightening member 64 is tightened. Namely, when the tightening member 64 is tightened, the tightening member 64 pulls the clamp band 60 towards the bracket 62 so that the handlebar contact surface 66 firmly contacts the handlebar H. Here, the handlebar contact surface 66 includes a first contact surface 66a and a second contact surface 66b (FIG. 12). The second contact surface 66b is separated from the first contact surface 66a in the axial direction D1 that is parallel to the handlebar mounting axis A1. Here, the first contact surface 66a and the second contact surface 66b are connected by a connection portion 62a (FIGS. 4 and 7). The first contact surface 66a, the second contact surface 66b and the connection portion 62a are integrally formed as a single piece. The connection portion 62a has an opening 62b (FIG. 13) for receiving the tightening member 64. Here, the tightening member 64 includes a threaded bolt 64a and a nut 64b. The nut 64b has a threaded bore with an internal thread that is screwed onto an external thread of the threaded bolt 64a.

As seen in FIG. 14, the base 14 includes a hose attachment port 70 that is disposed on one of a downwardly facing side and a rearwardly facing side of the base 14 while in the mounted state. The hose attachment port 70 is in fluid communication with the cylinder bore 30 such that hydraulic fluid can flow from and into the cylinder bore 30 via the hose attachment port 70. The hose attachment port 70 has an internal thread 70a for threadedly receiving a banjo bolt 72 to attach a hose connector 12a of the hydraulic hose 12 to the base 14. Namely, the banjo bolt 72 is screwed into the hose attachment port 70 to both attach the hose connector 12a of the hydraulic hose 12 to the base 14 and fluidly connect the hydraulic hose 12 to the cylinder bore 30. The banjo bolt 72 includes a center bore and at least one radial bore connected to the center bore for creating a hydraulic fluid passageway through the banjo bolt 72 in a conventional manner.

Preferably, the hose attachment port 70 has a center port axis A3 that is not parallel to the pivot axis P1. Here, in the first embodiment, the hose attachment port 70 is angled in a rearward direction while in the mounted state. In other words, the center port axis A3 of the hose attachment port 70 extends out of an exterior opening of the hose attachment port 70 in a rearward direction underneath the handlebar mounting structure 18. While it is preferable to have the hose attachment port 70 angled in the rearward direction, the arrangement of the hose attachment port 70 is not limited to this rearward orientation of the hose attachment port 70. It is contemplated that the hose attachment port 70 is located in a ninety degree range R1 with respect to a cylinder axis A2 of the cylinder bore 30. The ninety degree range R1 extends from the plane PL1 that is perpendicular to the pivot axis P1 and that includes the cylinder axis A2 to a plane PL2 that is parallel to the pivot axis P1 and that includes the cylinder axis A2. In other words, the ninety degree range R1 is defined by an arc centered on the cylinder axis A2 and extending between the planes PL1 and PL2. However, it is more preferred that the hose attachment port 70 is located in a forty-five degree range R2 with respect to the cylinder axis A2 of the cylinder bore 30 where the forty-five degree range R2 extends forty-five degrees from the plane PL2 in a direction towards the handlebar mounting structure 18. In this way, the hydraulic hose 12 can be easily routed underneath the handlebar H.

As seen in FIGS. 12 and 14 to 16, in the first embodiment, the hydraulic operating device 10 further comprises a hydraulic reservoir 74 that is connected to the cylinder bore 30. The hydraulic reservoir 74 is filled with a hydraulic fluid such as a mineral oil. As seen in FIG. 12, the hydraulic reservoir 74 is offset from the handlebar mounting structure 18 as viewed in the pivot axis direction D2. Preferably, the hydraulic reservoir 74 is an elongated chamber that that extends along the cylinder bore 30. Namely, the hydraulic reservoir 74 has a longitudinal axis A4 that is parallel to the cylinder axis A2 of the cylinder bore 30.

As seen in FIGS. 14 to 16, the hydraulic reservoir 74 is disposed above the cylinder bore 30 while in the mounted state. The hydraulic reservoir 74 is fluidly connected to the cylinder bore 30. Here, the hydraulic fluid within the hydraulic reservoir 74 is supplied to the cylinder bore 30 via a first fluid port 76 as seen in FIGS. 12 and 16. The first fluid port 76 is at least partially open to the cylinder bore 30 while the piston 32 is in the rest position (i.e., the operating member 16 is in a non-operated or rest position) and the piston adjustment member 56a adjusted to a non-contacting position with respect to the actuator 42. As seen in FIG. 12, the hydraulic reservoir 74 is further fluidly connected to the cylinder bore 30 by a plurality of second fluid ports 78 while the piston 32 is in the rest position. Here, in the first embodiment, the base 14 has three of the second fluid ports 78.

Optionally, a diaphragm can be provided in the hydraulic reservoir 74 as needed and/or desired. Also, optionally, the base 14 can be provided with a bleed valve that is fluidly connected to the hydraulic fluid chamber 36 of the hydraulic reservoir 74.

During movement of the piston 32 in response to operation of the operating member 16, hydraulic pressure is generated in the cylinder bore 30 through the movement of the piston 32. In particular, the piston 32 moves linearly within the cylinder bore 30 to force the hydraulic fluid out of the cylinder bore 30 via the hose attachment port 70 to the hydraulic operated device (e.g., the braking device) via the hydraulic hose 12.

Figure 18:
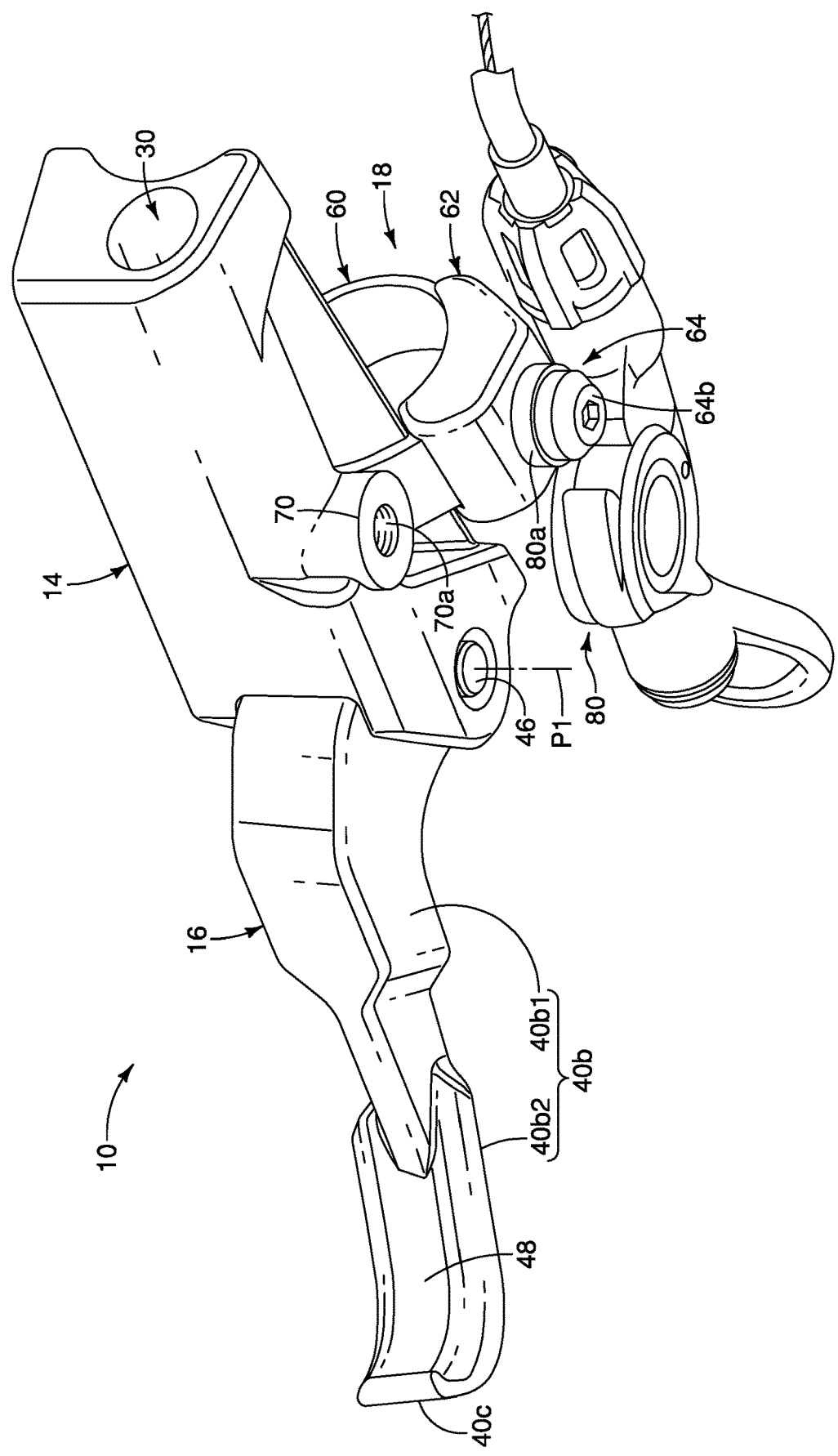
FIG. 18 is a bottom perspective view of the hydraulic operating device and the other device illustrated in FIG. 17.

As seen in FIGS. 17 and 18, the bracket 62 is configured to be coupled to at least one other device 80. In particular, in the first embodiment, the other device 80 is a bicycle component that is mounted to the bracket 62 using the tightening member 64. Namely, the other device 80 has a mounting portion 80a that receives the tightening member 64. Here, the other device 80 is a single levered operating device to operate one of a suspension and a height adjustable seat post. However, the other device 80 can be configured as an operating device having a plurality of levers to operate a bicycle transmission. Namely, the other device 80 can be configured as a shifter.

Figure 19:
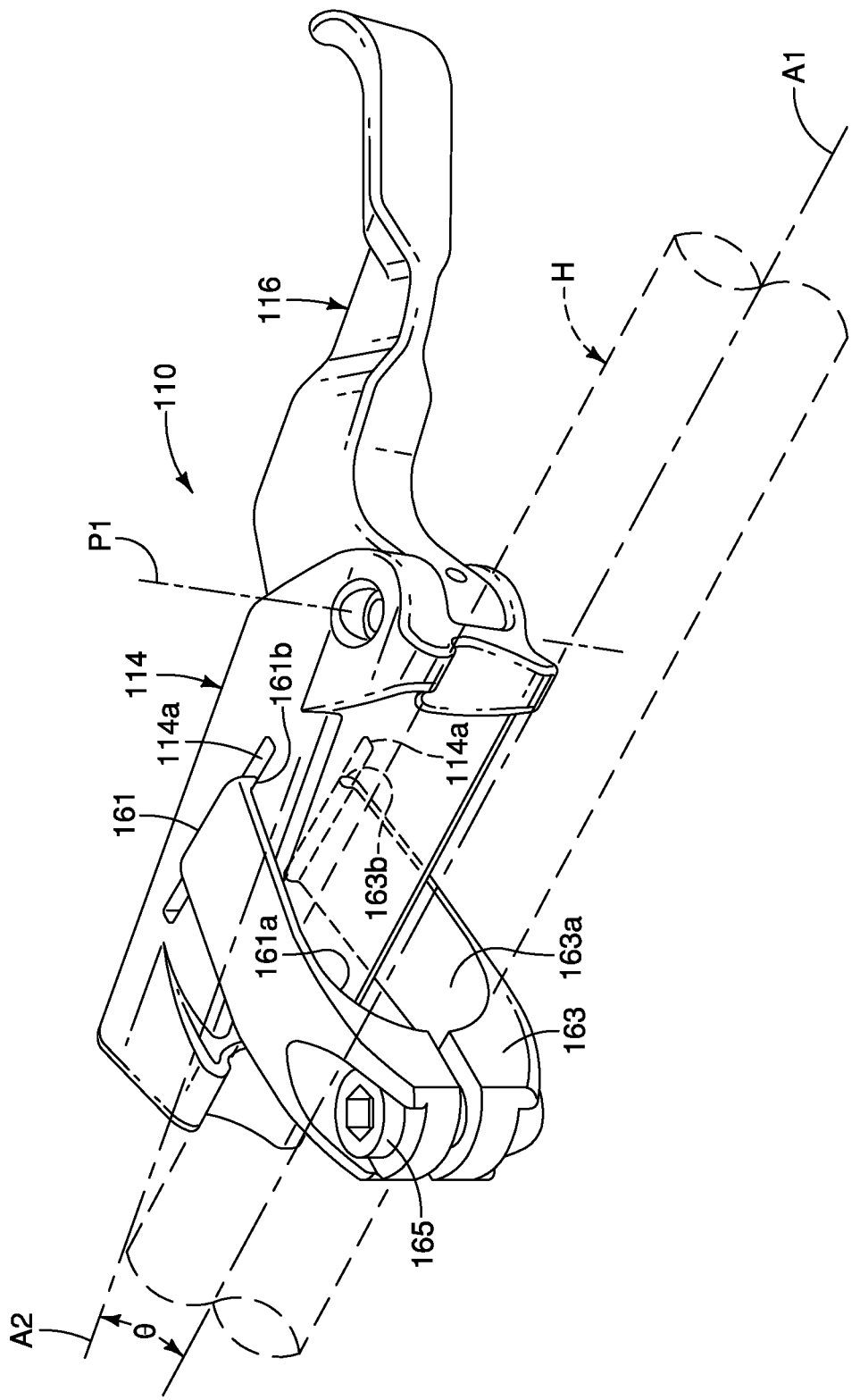
FIG. 19 is a top perspective view of a portion of the handlebar of the human-powered vehicle that is equipped with a hydraulic operating device in accordance with a second embodiment.

Referring now to FIG. 19, an operating device 110 is illustrated in accordance with a second embodiment. The operating device 110 is a hydraulic operating device that is provided for the human-powered vehicle V. The operating device 110 basically comprises a base 114, an operating member 116 and a handlebar mounting structure 118. Basically, the operating device 110 is identical to the hydraulic operating device 10 except for the structures for adjustably mounting the handlebar mounting structure 118 to the base 114 and the handlebar.

The base 114 is identical to the base 14, except that the guide 26 of the base 14 has been omitted and replaced with a guide 114a. Here, the guide 114a is a pair of grooves. The guide 114a (e.g., the grooves) extend parallel to the handlebar mounting axis A1 so that the base 114 can be adjusted parallel to the handlebar mounting axis A1. Thus, the cylinder axis A2 is angled relative to the handlebar mounting axis A1 as discussed above with respect to the first embodiment. Otherwise, the base 114 is identical to the base 14.

The operating member 116 is identical to the operating member 16, except that the operating lever 40 and the actuator 42 are a one-piece member such that the operating member position adjustment 50 is omitted in the operating device 110. Otherwise, the operating member 116 is identical to the operating member 16.

In the second embodiment, the handlebar mounting structure 118 includes a first clamp part 161, a second clamp part 163 and a tightening member 165. Here, the first tightening member 165 is a fixing bolt. The first clamp part 161 and the second clamp part 163 are basically mirror images of each other except that the first clamp part 161 has a through bore for receiving the tightening member 165 therethrough while the second clamp part 163 has a threaded bore for threadedly receiving the tightening member 165. The first and second clamp parts 161 and 163 are fastened together by the first and second tightening member 165. The first clamp part 161 includes a first curved handlebar contact surface 161a, while the second clamp part 163 includes a second curved handlebar contact surface 163a. The first curved handlebar contact surface 161a and the second curved handlebar contact surface 163a are clamped to the handlebar H by tightening the first tightening member 165. The first clamp part 161 further includes a first engagement part 161b, while the second clamp part 163 includes a second engagement part 163b. The first and second engagement parts 161b and 163b are clamped to the base 114 by tightening the tightening member 165. The first and second engagement parts 161b and 163b are disposed in the guide 114a (e.g., the grooves) such that the position of the base 114 relative to the handlebar mounting structure 118 can be adjusted by loosening and retightening the tightening member 165.

Referring now to FIGS. 20 to 34, an operating device 210 is provided for a human-powered vehicle V in accordance with a third embodiment. As in the other embodiments, the operating device 210 is a hydraulic operating device that is provided for the human-powered vehicle V. The operating device 210 is mounted to the handlebar H of the human-powered vehicle V in the same manner as the other embodiments. Thus, the operating device 210 is a bicycle hydraulic brake operating device. Hereinafter, the operating device 210 is consistently referred as the hydraulic operating device 210. Several of the features of the hydraulic operating device 210 are the same as the hydraulic operating device 10 of the first embodiment. Thus, the directional terms used in describing the hydraulic operating device 10 will be used to describe the hydraulic operating device 210.

The hydraulic operating device 210 is fluidly connected to a hydraulic operated device (not shown) by a hydraulic hose 212. Here, the hydraulic operating device 210 is a right-hand side hydraulic brake actuating device that is operated by the rider's right hand from a rest or non-operated position (FIGS. 20 to 25) to an operated position (FIGS. 26 to 34) for actuating the hydraulic operated device such as a disc brake caliper. It will be apparent to those skilled in the bicycle field that the configuration of the hydraulic operating device 210 can be adapted to a left-hand side hydraulic brake actuating device that is operated by the rider's left hand. Also, the hydraulic operating device 210 can be used with other vehicle components other than a disc brake caliper.

The hydraulic operating device 10 basically comprises a base 214, an operating member 216 and a handlebar mounting structure 218. The handlebar mounting structure 218 is identical to the handlebar mounting structure 18 of the first embodiment. Thus, the handlebar mounting structure 218 is adjustably coupled to the base 214. In particular, like the other embodiments, the handlebar mounting structure 218 is adjustably mounted to the base 214 in the axial direction D1 that is parallel to a handlebar mounting axis A1 by loosening the handlebar mounting structure 218 and then re-tightening the handlebar mounting structure 218. Also, like the other embodiments, the handlebar mounting structure 218 is adjustably coupled to the base 214 around the handlebar mounting axis A1 by loosening the handlebar mounting structure 218 and then re-tightening the handlebar mounting structure 218.

The operating member 216 is pivotally coupled to the base 214 about the pivot axis P1 between a rest position (FIGS. 20 to 25) and an operated position (see FIGS. 26 to 34). Here, the pivot axis P1 of the operating member 216 is located in an area between a cylinder axis A2 and the handlebar mounting axis A1 as viewed in the pivot axis direction D2, which is parallel to the pivot axis P1. Preferably, a linear distance L1 (shortest distance) between the pivot axis P1 and the handlebar mounting axis A1 as viewed in the pivot axis direction D2 is in a range from fifteen millimeters to thirty millimeters. Here, in the third embodiment, the linear distance L1 is twenty-one millimeters.

In the third embodiment, as mentioned above, the handlebar mounting structure 218 is coupled to the base 214. The handlebar mounting structure 18 defines the handlebar mounting axis A1 that extends linearly along the handlebar H in a mounted state in which the base 214 is mounted to the handlebar H by the handlebar mounting structure 218. The handlebar mounting axis A1 substantially coincides with a longitudinal center axis of the handlebar H in the mounting state.

The base 214 includes a handlebar contact portion 220. The handlebar contact portion 220 is configured to contact the handlebar H in a mounted state in which the base 214 is mounted to the handlebar H by the handlebar mounting structure 218. In the first embodiment, the handlebar contact portion 220 has a first handlebar abutment 221 and a second handlebar abutment 222. The handlebar mounting structure 218 is arranged between the first handlebar abutment 221 and the second handlebar abutment 222. In the third embodiment, the base 214 includes a main body 224. The handlebar contact portion 220 is integrally formed with the main body 224.

Preferably, the first handlebar abutment 221 has a first curved handlebar abutment surface 221a, and the second handlebar abutment 222 has a second curved handlebar abutment surface 222a. The curvatures of the first and second curved handlebar abutment surfaces 221a and 222a are the same in the third embodiment. Preferably, the curvatures of the first and second curved handlebar abutment surfaces 221a and 222a are substantially the same as the curvature of the handlebar H or slightly larger than the curvature of the handlebar H. In this way, the first and second curved handlebar abutment surfaces 221a and 222a can firmly contact the handlebar H at two locations when the hydraulic operating device 210 is in a mounted state in which the base 214 is mounted to the handlebar H by the handlebar mounting structure 218.

Here, the base 214 has a guide 226 that extends in the axial direction D1. The guide 226 is integrally formed with the main body 224 and extends between the first and second handlebar abutments 221 and 222. Thus, the guide 26 is located between the first handlebar abutment 221 and the second handlebar abutment 22. In this way, the handlebar mounting structure 218 is adjustably coupled to the guide 226 in the axial direction D1 that is parallel to the handlebar mounting axis A1.

As mentioned above, in the illustrated embodiments, the hydraulic operating device 210 is a hydraulic operating device. In such a case, the base 214 includes a cylinder bore 230 that defines the cylinder axis A2. The hydraulic operating device 210 further comprises a piston 232 that is movably provided in the cylinder bore 230. The cylinder bore 230 is provided in the main body 224 of the base 214. Preferably, a linear distance L2 between the pivot axis P1 and the cylinder axis A2 as viewed in the pivot axis direction D2 is in a range from three millimeters to fifteen millimeters. Here, in the third embodiment, the linear distance (shortest distance) L2 is seven and one-half millimeters.

Here, the cylinder axis A2 extends non-perpendicularly with respect to the handlebar mounting axis A1 as viewed in the pivot axis direction D2 that is parallel to the pivot axis P1 of the operating member 216. Also, the cylinder axis A2 is not parallel to the handlebar mounting axis A1 of the handlebar arrangement area A as viewed in the pivot axis direction D2. The cylinder axis A2 of the cylinder bore 230 is inclined towards the handlebar mounting axis A1 as the cylinder bore 230 extends away from the pivot axis as viewed in the pivot axis direction D2 parallel to the pivot axis P1. In other words, the cylinder axis A2 diverges away from the handlebar mounting axis A1 in an actuation direction of the piston 232 (i.e., a right side direction in the third embodiment). Preferably, as in the third embodiment, the cylinder axis A2 and the handlebar mounting axis A1 form an inclination angle θ in a range from one degrees to twenty-five degrees. More preferably, the inclination angle θ is in a range from five degrees to fifteen degrees. In the third embodiment, the inclination angle θ is ten degrees As mentioned above, the piston 232 is movably provided in the cylinder bore 230. The piston 232 is provided with a first annular sealing ring 234A and a second annular sealing ring 234B. The first and second annular sealing rings 234A and 234B are preferably elastomeric (e.g., rubber) O-rings that have uniform cross sectional profiles. The first and second annular sealing rings 234A and 234B slidably contact an internal surface of the cylinder bore 230. The cylinder bore 230 and the first annular sealing ring 234A of the piston 232 define a hydraulic pressure chamber 236 that changes in size in response to the operation of the operating member 216. The hydraulic pressure chamber 236 is filled with a hydraulic fluid such as a mineral oil.

A biasing element 238 is disposed in the cylinder bore 230, and biases the piston 232 to a non-actuated (rest or non-operated) position. Here, the biasing element 238 is a coil compression spring that biases the piston 232 to the non-actuated position. The biasing element 238 also biases the operating member 216 to its rest position (i.e., no external force applied to the operating member 216). Thus, the piston 232 compresses the biasing element 238 as the piston 232 moves in the cylinder bore 230 in response to an operation of the operating member 216.

The piston 232 is operatively coupled to the operating member 216 to move the piston 232 within the cylinder bore 230 in response to operation of the operating member 216. Namely, as seen in FIGS. 25 to 34, the piston 232 is coupled to the operating member 216 to be pushed in response to a pivotal movement of the operating member 216 from the rest position to the operated position. The piston 232 moves linearly along the cylinder axis A2 within the cylinder bore 230 in response to operation of the operating member 216.

Figure 23:
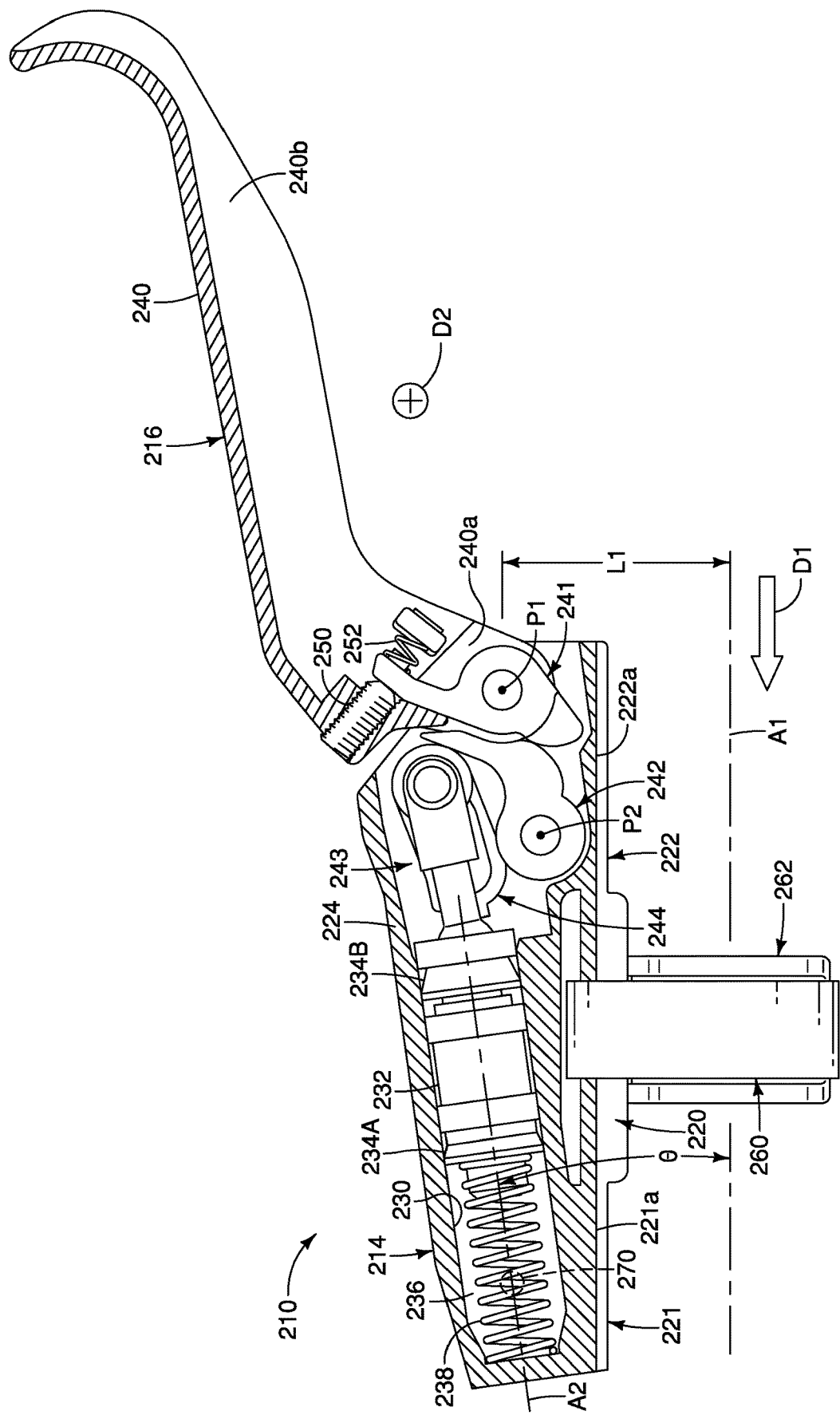
FIG. 23 is a cross-sectional view of the hydraulic operating device illustrated in FIGS. 20 to 22 as taken along section plane perpendicular to the pivot axis of the brake operating member of the hydraulic operating device and passing through a cylinder axis of a cylinder bore provided in a base of the hydraulic operating device.
Figure 24:
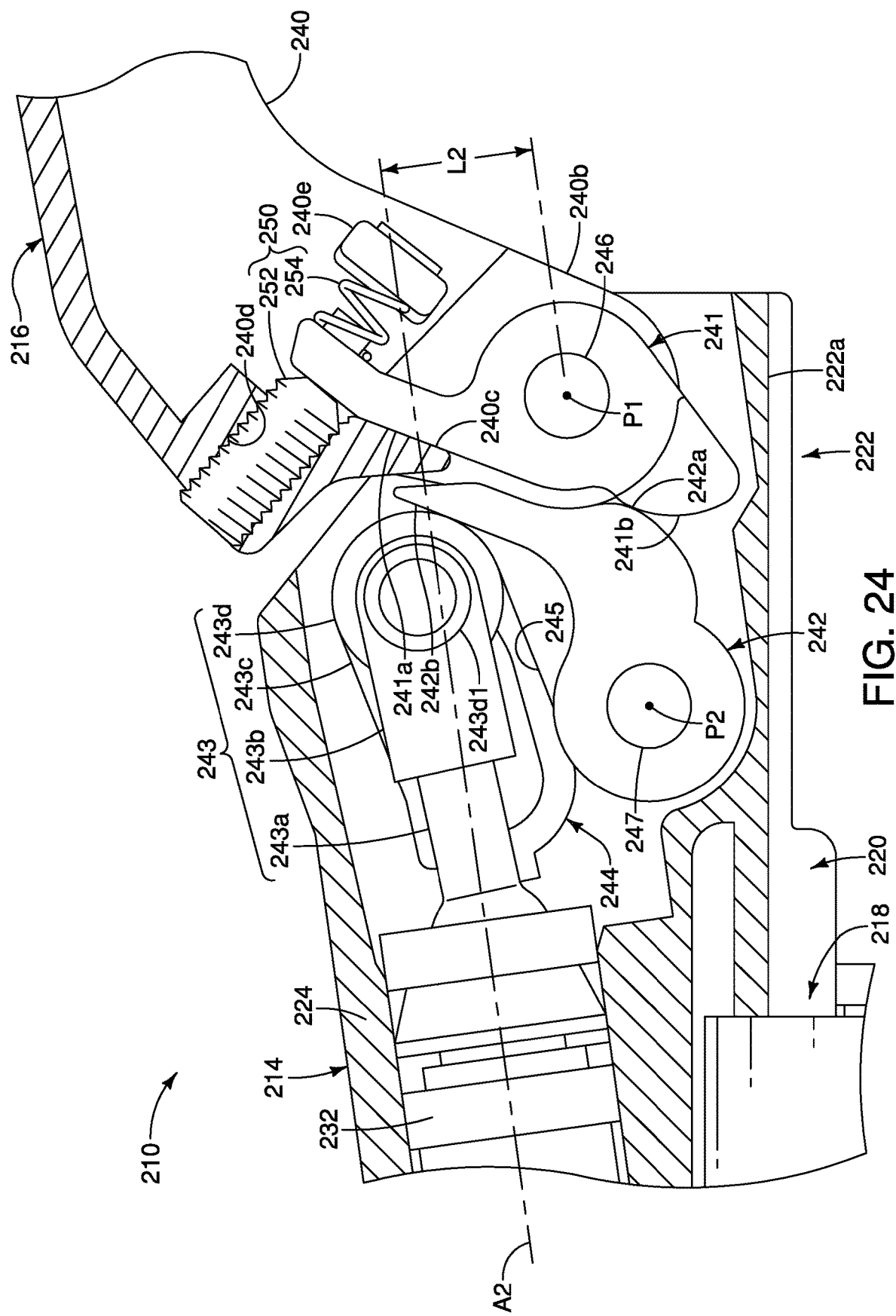
FIG. 24 is a partial enlarged cross-sectional view of a portion of the hydraulic operating device illustrated in FIG. 23.
Figure 25:
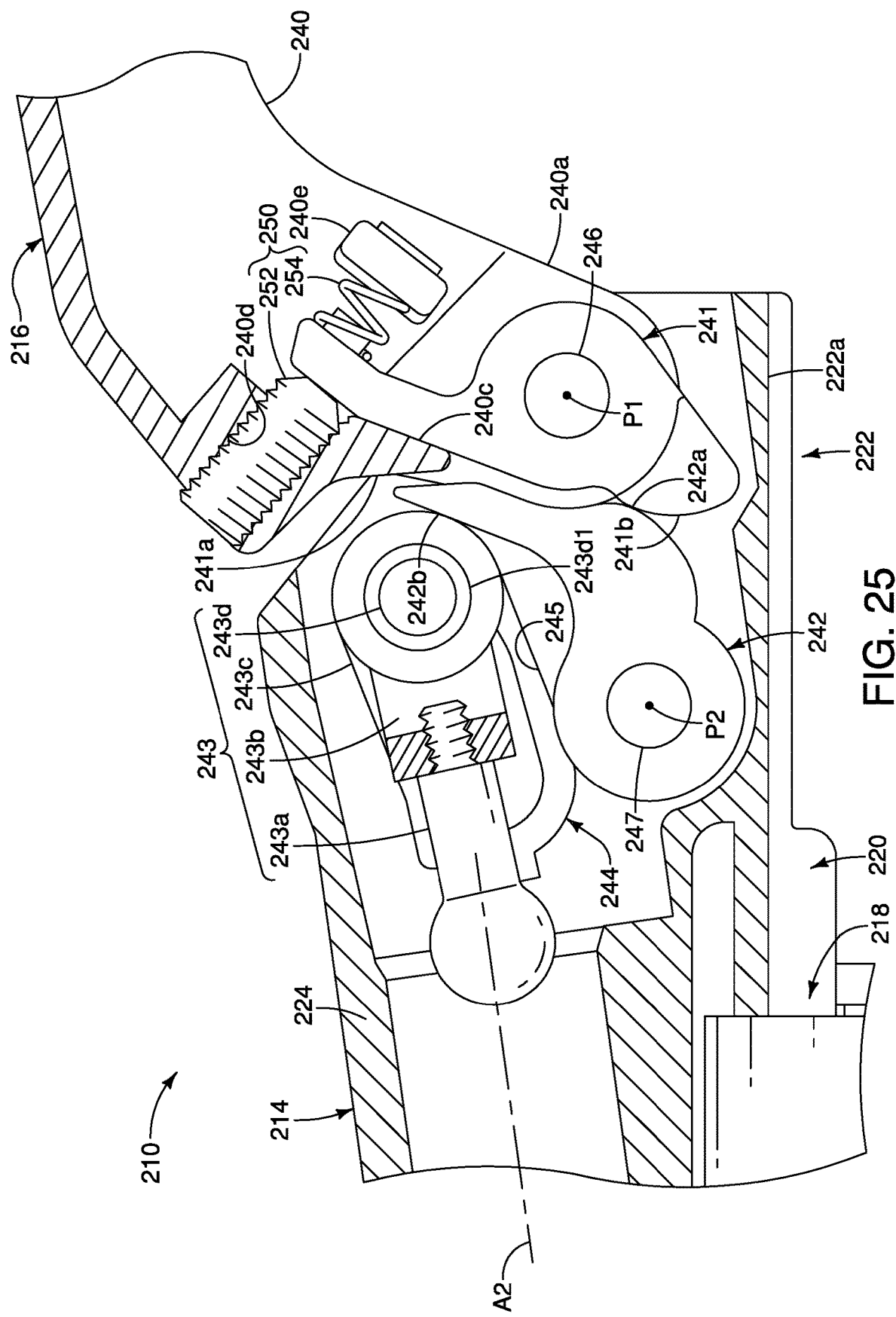
FIG. 25 is a partial enlarged cross-sectional view, similar to FIG. 24, of the portion of the hydraulic operating device but with additional parts removed for purposes of illustration.
Figure 26:
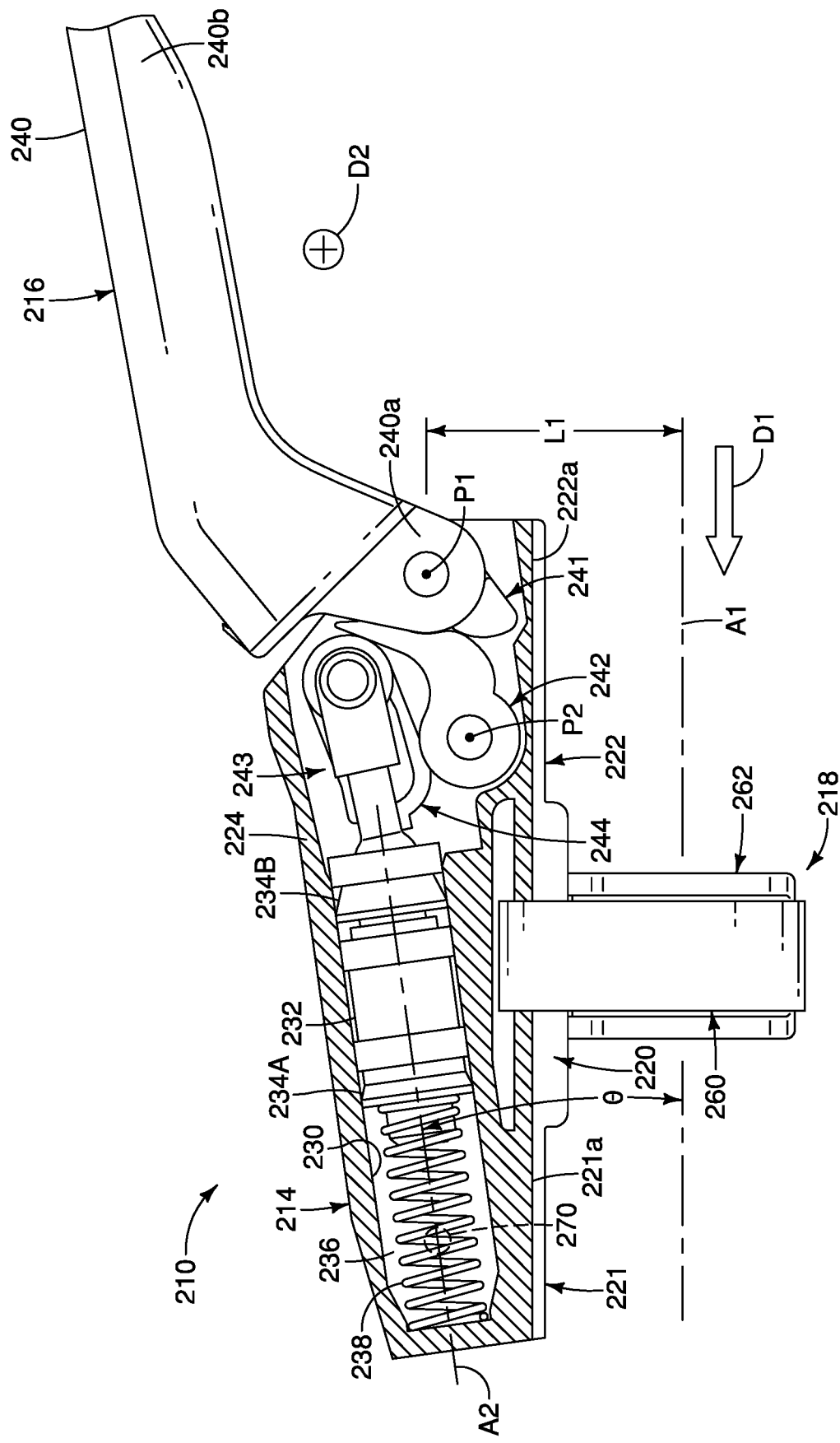
FIG. 26 is a top view of the hydraulic operating device illustrated in FIGS. 1 and 2, but in which the operating member (the operating lever) has been moved to an operated position.
Figure 29:
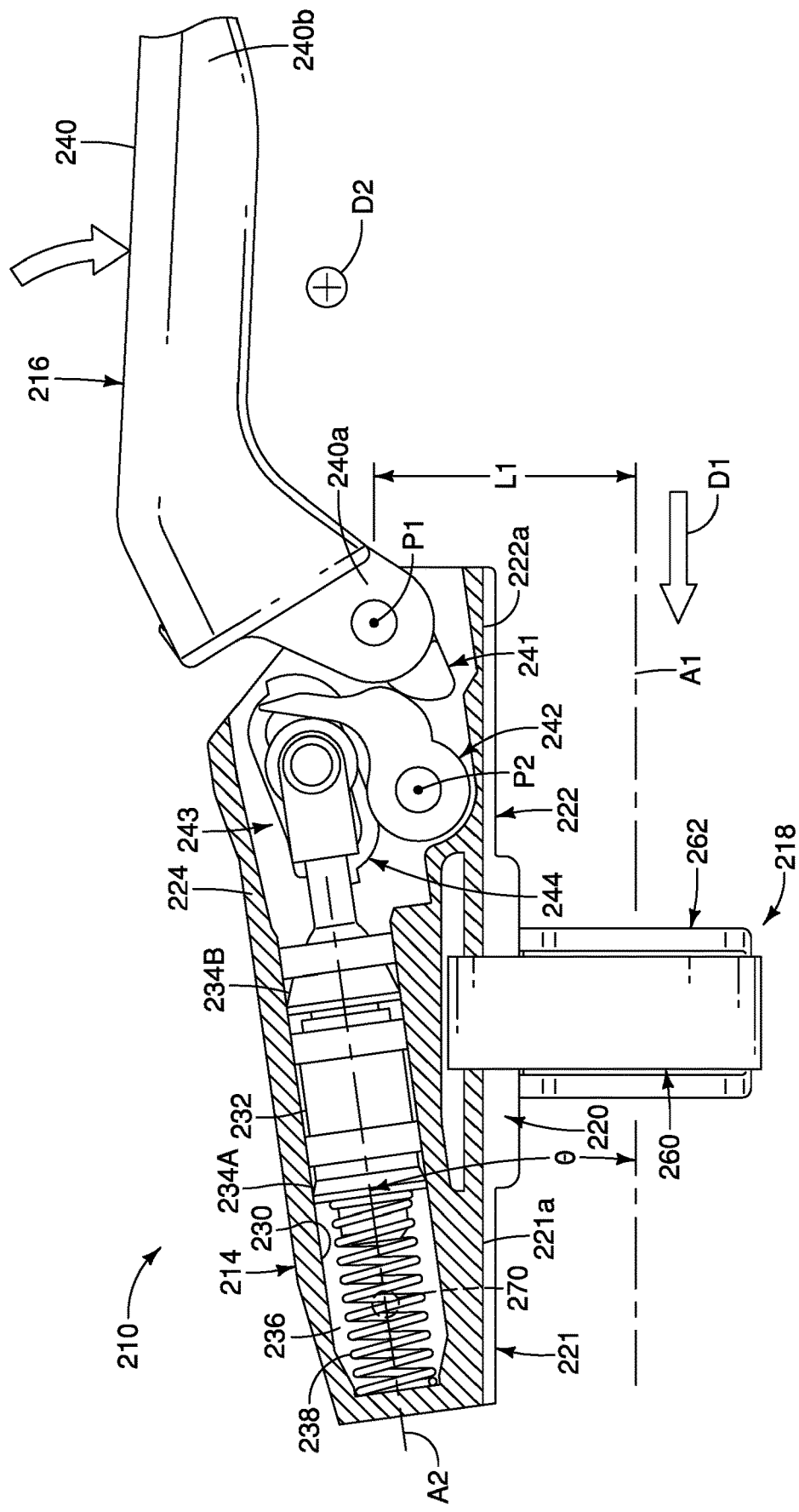
FIG. 29 is a top view of the hydraulic operating device illustrated in FIGS. 1 and 2, but in which the operating member has been moved to an actuated position that is farther from the rest position than the operated position of FIGS. 26 to 28.
Figure 31:
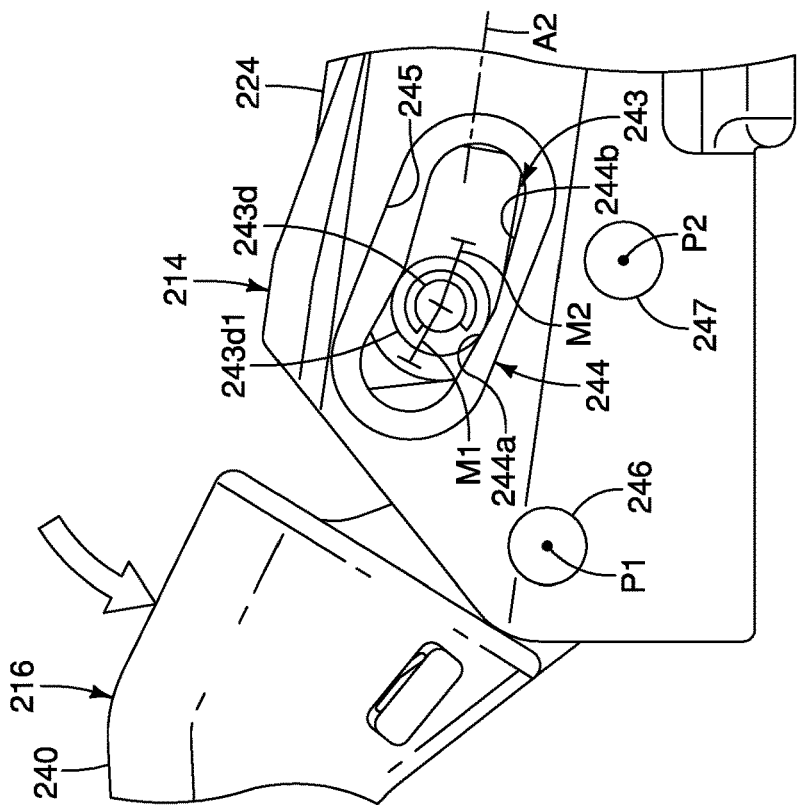
FIG. 31 is a partial bottom view of the portion of the hydraulic operating device illustrated in FIG. 30.
Figure 30:
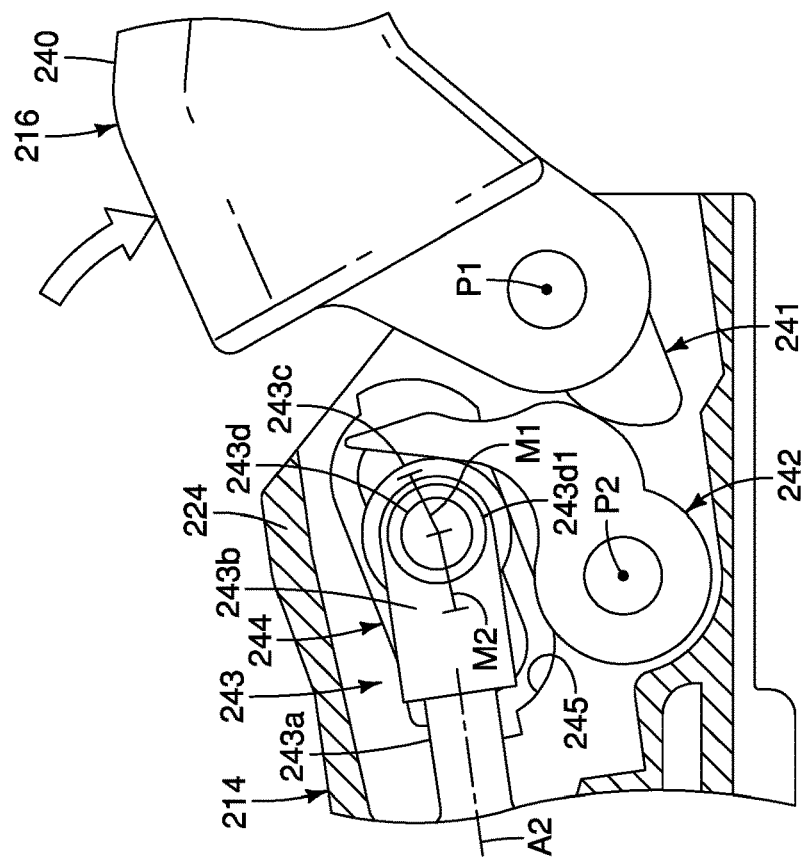
FIG. 30 is a partial enlarged cross-sectional view of the portion of the hydraulic operating device illustrated in FIG. 29.
Figure 32:
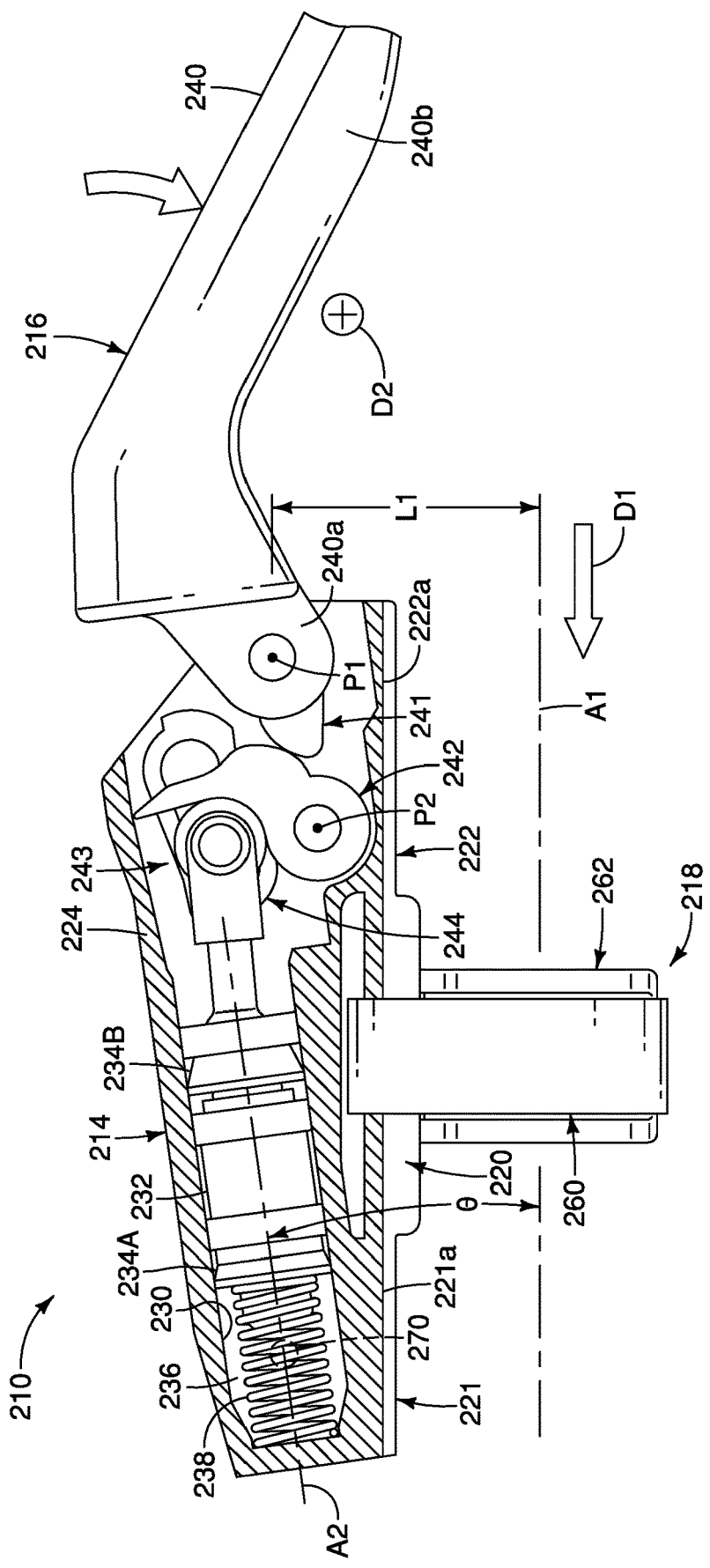
FIG. 32 is a top view of the hydraulic operating device illustrated in FIGS. 1 and 2, but in which the operating member has been moved to an actuated position that is farther from the rest position than the operated position of FIGS. 29 to 31.
Figure 34:
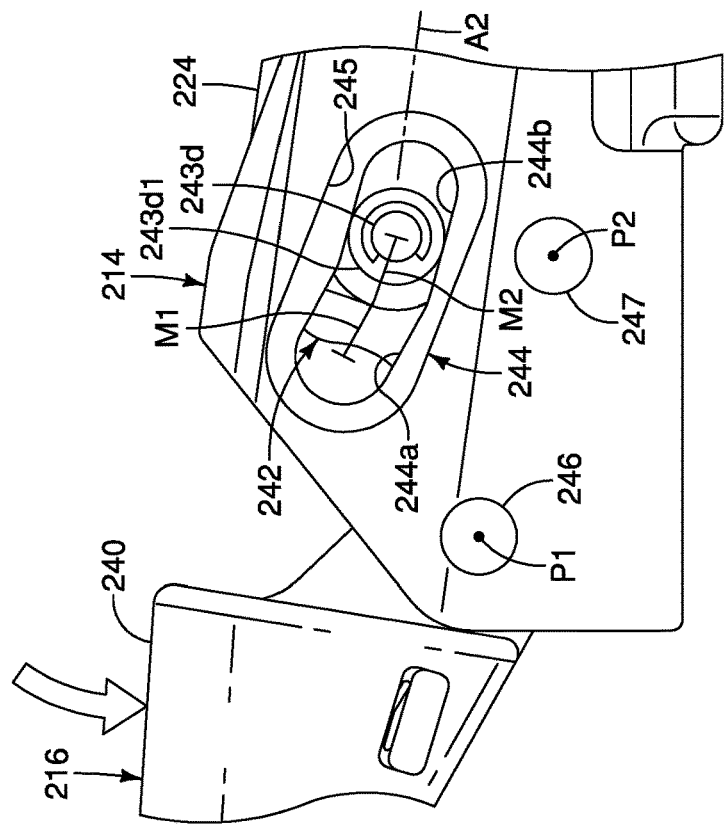
FIG. 34 is a partial bottom view of the portion of the hydraulic operating device illustrated in FIG. 33.
Figure 33:
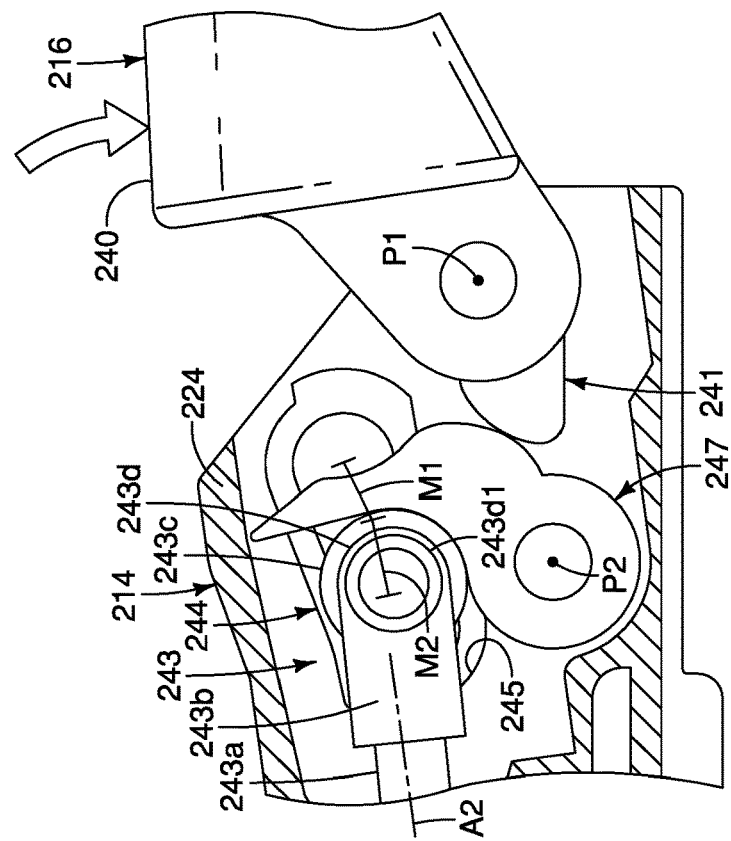
FIG. 33 is a partial enlarged cross-sectional view of the portion of the hydraulic operating device illustrated in FIG. 32.

Referring to FIGS. 23 to 25, the operating member 216 includes an operating lever 240. The operating lever 240 includes a mounting portion 240a and a lever portion 240b. The hydraulic operating device 210 further comprises a torque transmission mechanism 241 that operatively connects the piston 232 and the operating member 216 to push the piston 232 at a non-constant actuation ratio of a movement of the operating member 216 to a movement of the piston 232. As will be explained below, the torque transmission mechanism 241 is configured to move the piston 232 at a first actuation ratio R1 with respect to a movement amount of the operating member 216 during a beginning section M1 of the movement of the operating member 216 and to move the piston 232 at a second actuation ratio R2 with respect to the movement amount of the operating member 216 during a subsequent section M2 of the movement of the operating member 216. The first actuation ratio R1 is larger than the second actuation ratio R2.

In the third embodiment, the torque transmission mechanism 241 of the hydraulic operating device 210 further comprises a first torque transmission member 241 movably mounted to the base 214, and a second torque transmission member 242 movably mounted to the base 214. Preferably, the first torque transmission member 241 is pivotally coupled to the base 214, and the second torque transmission member 242 is pivotally coupled to the base 214. In particular, in the illustrated embodiment, the first torque transmission member 241 is pivotally coupled to the base 214 about the pivot axis P1, and the second torque transmission member 242 is pivotally coupled to the base 214 about an additional pivot axis P2 different from the pivot axis P2.

In the third embodiment, the torque transmission mechanism 241 of the hydraulic operating device 210 further comprises a connecting rod 243 and a cam guide 244. The connecting rod 243 is operatively connected between the piston 232 and the operating member 216. The cam guide 244 supports the connecting rod 243 to the base 214. The cam guide 244 is shaped to control movement of the piston 232 at a non-constant actuation ratio of a movement of the operating member 216 to a movement of the piston 232.

Preferably, the pair of cam guides 244 are provided to the base 214 on opposite sides of the connecting rod 243. In the third embodiment, the cam guides 244 are disposed in elongated slots 245 that are formed in the main body 224 of the base 214. The cam guides 244 are removably retained in the elongated slots 245. Each of the cam guides 244 has a profiled cam surface that controls the movement of the piston 232 with respect to the movement of the operating member 216 via the first and second torque transmission members 241 and 242. Here, each of the cam guides 244 has a first camming section 244a and a second camming section 244b. The first camming section 244a is angled relative to the cylinder axis A2 so that the connecting rod 243 moves the piston 232 at the first actuation ratio R1 with respect to the movement amount of the operating member 216 during the beginning section M1 of the movement of the operating member 216. The second camming section 244b is angled relative to the cylinder axis A2 so that the connecting rod 243 moves the piston 232 at the first actuation ratio R2 with respect to the movement amount of the operating member 216 during the subsequent section M2 of the movement of the operating member 216. In this way, the angle of the connecting rod 243 with respect to the cylinder axis A2 becomes smaller as the connecting rod 243 moves under the control of the cam guides 244 from the first camming section 244a to the second camming section 244b.

Here, the connecting rod 243 includes a shaft 243a, a yoke 243b, a roller 243c and a support pin 243d. The shaft 243a has one end operatively connected to the piston 232 and a second end fixed to the yoke 243b. The yoke 243b rotatably supports the roller 243c via the support pin 243d. The roller 243c is preferably rotatably supported on the support pin 243d by a bearing (not shown). The ends of the support pin 243d are located in the cam guides 244 for controlling the movement of the connecting rod 243 with respect to the base 214. Here, the ends of the support pin 243d are each provided with a low friction sleeve 243d1.

In the third embodiment, preferably, the operating lever 240 and the first torque transmission member 241 are pivotally mounted to the base 214 by a first pivot pin 246. A center axis of the first pivot pin 246 defines the pivot axis P1. In particular, the mounting portion 240a of the operating lever 240 is pivotally mounted relative to the base 214 by the pivot pin 246. The lever portion 240b of the operating lever 240 extends from the mounting portion 240a to a distal free end of the operating lever 240. In this way, a user moves the lever portion 240b of the operating lever 240 such that the operating lever 240 and the first torque transmission member 241 pivot together as a unit relative to the base 14 on the pivot pin 246 from the rest (non-operated) position (FIGS. 20 to 25) to the operated position (FIGS. 26 to 34). The second torque transmission member 242 is pivotally mounted to the base 214 by a second pivot pin 247. A center axis of the second pivot pin 247 defines the pivot axis P2. The first and second pivot pins 246 and 247 are parallel and offset from each other. The second torque transmission member 242 is pivoted by the first torque transmission member 241 as the operating lever 240 is operated by a user.

In particular, the first torque transmission member 241 contacts the second torque transmission member 242 as the operating lever 240 is operated by a user such that the first and second torque transmission members 241 and 242 pivot at the same speed. Thus, the actuation ratios of each of the first and second torque transmission members 241 and 242 to the operating lever 240 are equal. In other words, the angular displacement of the first torque transmission member 241 about the pivot axis P1 and the angular displacement of the second torque transmission member 242 are both equal to the angular displacement of the operating lever 240 about the pivot axis P1.

More specifically, the first torque transmission member 241 has a first contact portion 241a and a second contact portion 241b. Here, the first and second contact portions 241a and 241b are curved contact surfaces. The first contact portion 241a is configured to receive an input torque from the operating member 216. Namely, the first contact portion 241a contacts the abutment 240c of the operating lever 240 to receive an input torque from the operating member 216. The second contact portion 241b is configured to transmit the input torque to the second torque transmission member 242. The second torque transmission member 242 has a third contact portion 242a and a fourth contact portion 242b. The third contact portion 242a is configured to receive a transmitted torque from the first torque transmission member 246. Namely, the third contact portion 242a contacts the second contact portion 241b to receive a transmitted torque from the first torque transmission member 246. Here, the second contact portion 241b and the third contact portions 242a are curved contact surfaces. The fourth contact portion 242b is configured to transmit the transmitted torque to the connecting rod 243. In particular, the fourth contact portion 242b contacts the roller 243c of the connecting rod 243.

Referring to FIGS. 24 and 25, the operating member 16 further includes an operating member position adjustment 250. The operating member position adjustment 250 is also called a reach adjustment. In other words, the operating member position adjustment 250 adjusts the rest position or non-actuated position of the operating lever 240 relative to the base 214. In this way, the distance or reach between the lever portion 240b of the operating lever 240 and the handlebar H can be adjusted. Basically, the operating member position adjustment 250 changes a relative position between the operating lever 240 and the first torque transmission member 241.

The operating member position adjustment 250 includes an adjustment member 252 and a biasing element 254. Here, in the third embodiment, the adjustment member 252 is a set screw that is threaded into a threaded bore 240d of the mounting portion 240a of the operating lever 240. The biasing element 254 is a compression disposed between an abutment 240e of the operating lever 240 and the first contact portion 241a. In this way, the biasing element 254 applies a biasing force between the operating lever 240 and the first torque transmission member 241 forcing the first contact portion 241a against the adjustment member 252 (e.g., the set screw). When the adjustment member 252 is adjusted to increase the reach of the operating lever 240 from the position shown in FIGS. 24 and 25, the operating lever 240 pivots in the counterclockwise direction about the pivot axis P1 while the first torque transmission member 241 remains stationary. In such an adjusted reach position of the operating lever 240, the tip of the adjustment member 252 becomes the abutment of the operating lever 240 that is contacted by the first contact portion 241a. As a result of the biasing force of the biasing element 254, the operating lever 240 and the first torque transmission member 241 move as a rigid unit when the operating lever 240 is operated from the rest position to the operated position. If the operating member position adjustment 250 is not used, then the first torque transmission member 241 can be made integral with the operating lever 240.

Figure 20:
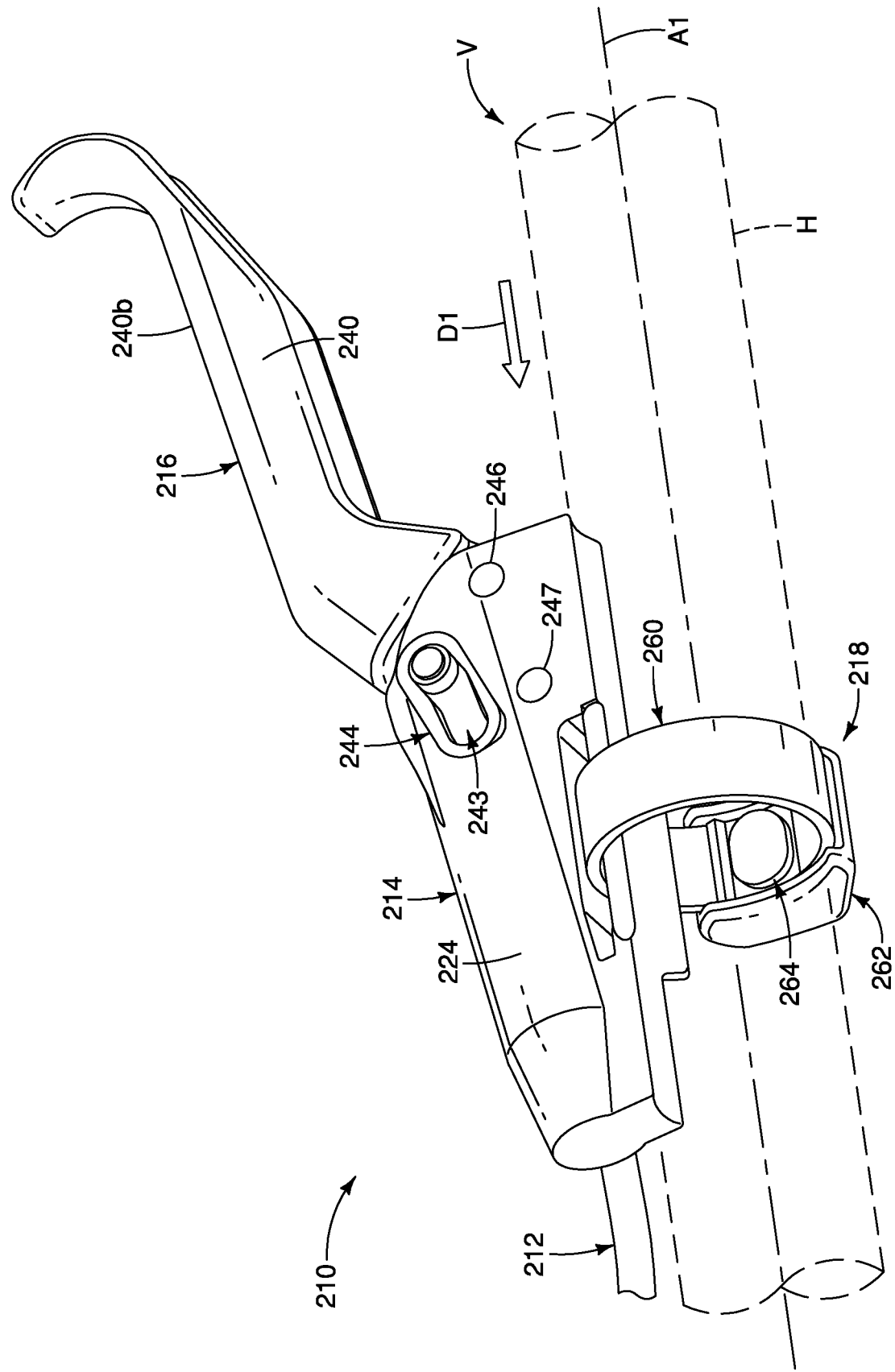
FIG. 20 is a top perspective view of a portion of the handlebar of the human-powered vehicle that is equipped with a hydraulic operating device in accordance with a third embodiment.
Figure 21:
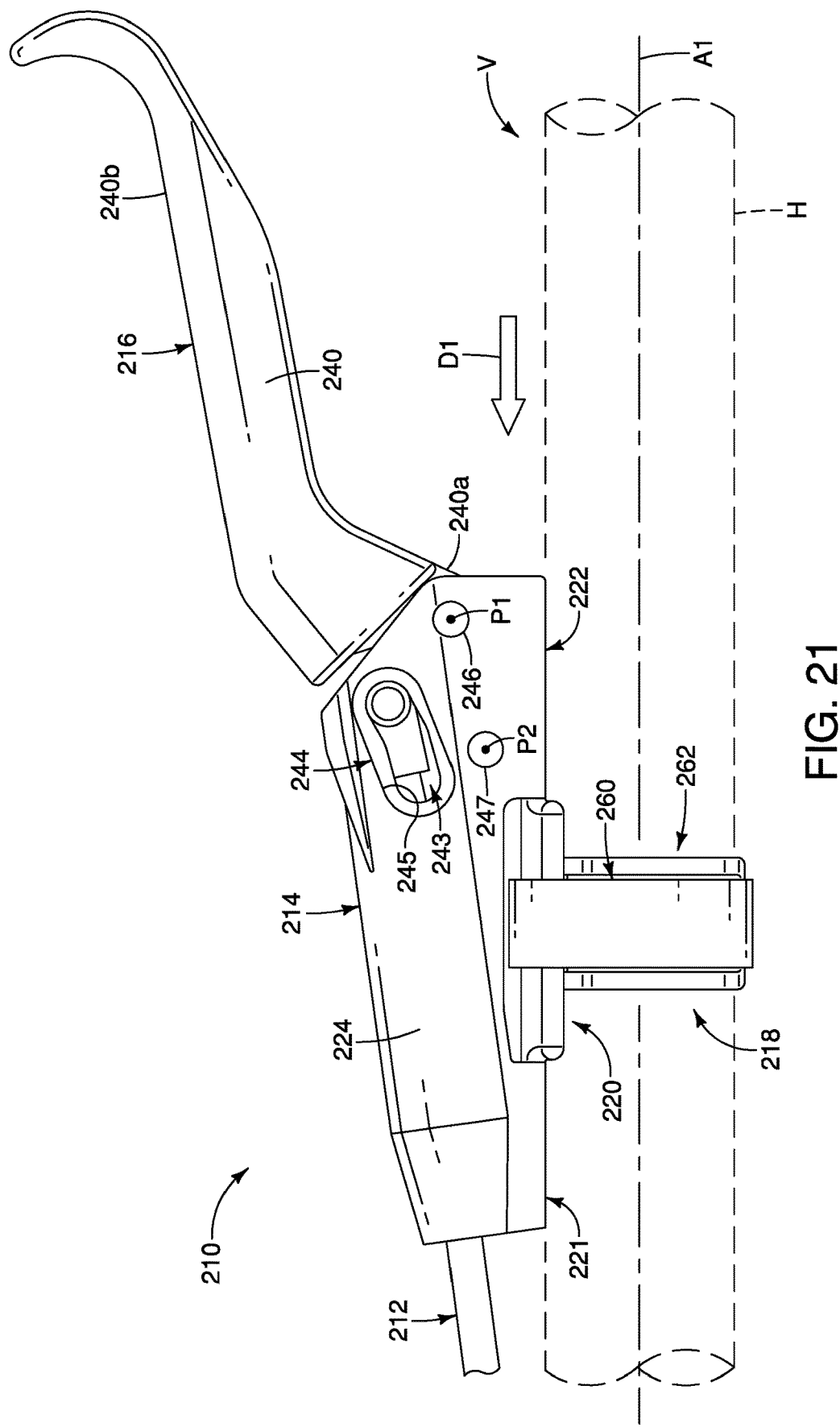
FIG. 21 is a top view of the portion of the handlebar and the hydraulic operating device illustrated in FIG. 20 in which an operating member (an operating lever) is in a rest position.
Figure 22:
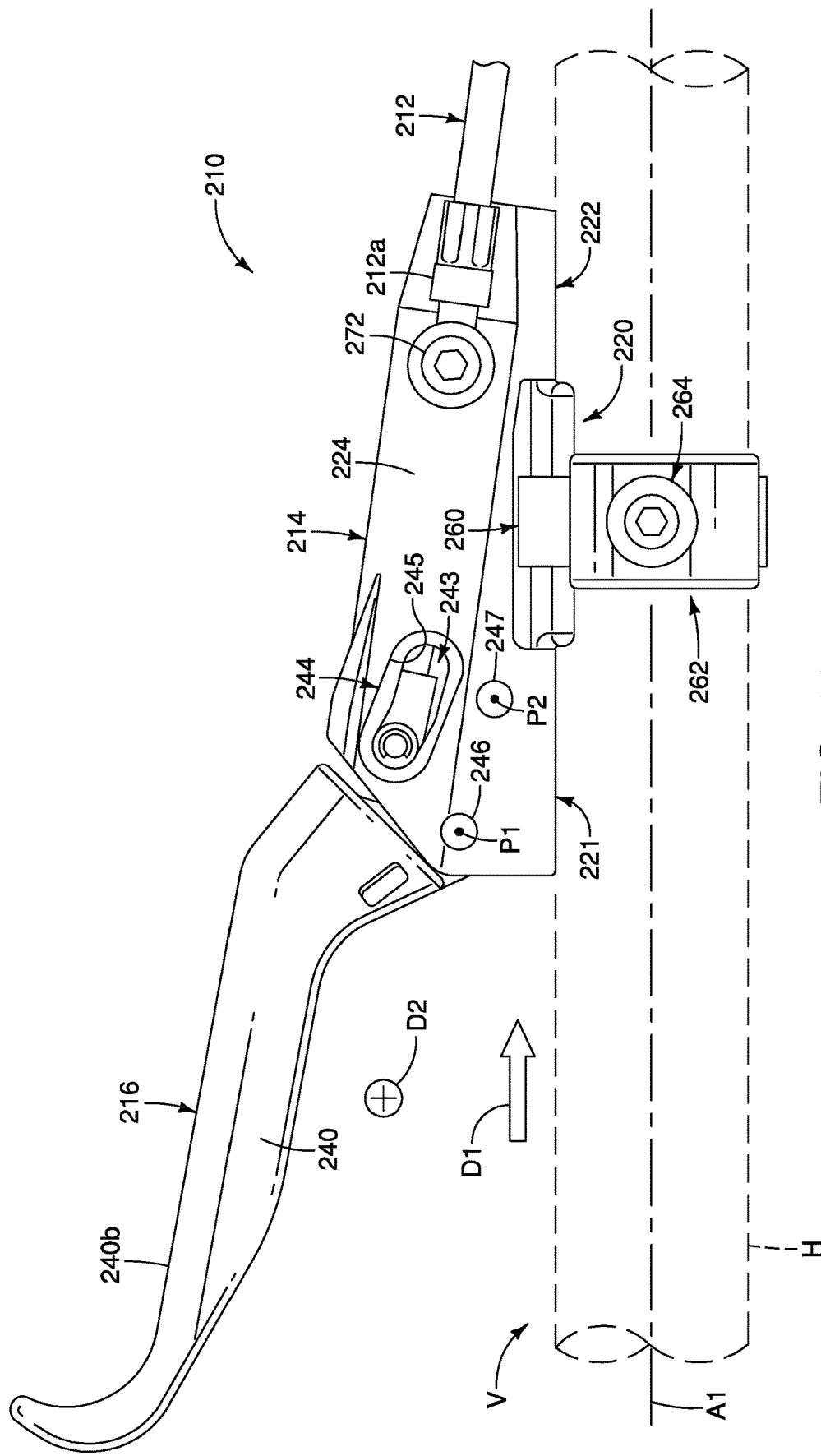
FIG. 22 is a bottom plan view of the portion of the handlebar and the hydraulic operating device illustrated in FIGS. 20 and 21.

As seen in FIGS. 20 to 22, the handlebar mounting structure 218 includes a clamp band 260, a bracket 262 and a tightening member 264. The handlebar mounting structure 218 is identical to the handlebar mounting structure 18 of the first embodiment. Thus, the clamp band 260 is looped around the guide 226 of the base 214. The tightening member 264 adjustably couples the bracket 262 relative to the clamp band 260. The bracket 262 is moved relative to the clamp band 60 upon adjustment of the tightening member 264. In other words, the tightening member 264 is tightened and loosened to move the bracket 262 relative to the clamp band 260. The bracket 262 is separate from the base 214.

As seen in FIG. 23, the base 214 includes a hose attachment port 270 that is disposed on one of a downwardly facing side of the base 214 while in the mounted state. The hose attachment port 270 is in fluid communication with the cylinder bore 230 such that hydraulic fluid can flow from and into the cylinder bore 230 via the hose attachment port 270. As seen in FIG. 22, a banjo bolt 272 is attached to the hose attachment port 270 which has an internal thread for threadedly receiving the banjo bolt 272 to attach a hose connector 212a of the hydraulic hose 212 to the base 214. Namely, the banjo bolt 272 is screwed into the hose attachment port 270 to both attach the hose connector 212a of the hydraulic hose 212 to the base 214 and fluidly connect the hydraulic hose 212 to the cylinder bore 230. The banjo bolt 272 includes a center bore and at least one radial bore connected to the center bore for creating a hydraulic fluid passageway through the banjo bolt 272 in a conventional manner.

Preferably, the hose attachment port 270 has a center port axis that is not parallel to the pivot axis P1. More preferably, in the third embodiment, the hose attachment port 270 is angled in a rearward direction while in the mounted state. In other words, the center port axis of the hose attachment port 270 extends out of an exterior opening of the hose attachment port 270 in a rearward direction underneath the handlebar mounting structure 218. While it is preferable to have the hose attachment port 270 angled in the rearward direction, the arrangement of the hose attachment port 270 is not limited to this rearward orientation of the hose attachment port 270.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the hydraulic operating device. Accordingly, these directional terms, as utilized to describe the hydraulic operating device should be interpreted relative to a bicycle in an upright riding position on a horizontal surface and that is equipped with the hydraulic operating device. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hydraulic operating device for a human-powered vehicle, the hydraulic operating device comprising:
a base including a cylinder bore defining a cylinder axis, the cylinder bore having a first end and a second end where the second end is spaced from the first end along the cylinder axis;
an operating member pivotally coupled to the base about a pivot axis between a rest position and an operated position;
a piston movably provided in the cylinder bore, the piston being coupled to the operating member to be pushed in response to a pivotal movement of the operating member from the rest position to the operated position;
a handlebar mounting structure coupled to the base, the handlebar mounting structure defining a handlebar mounting axis that extends linearly along a handlebar in a mounted state in which the base is mounted to the handlebar by the handlebar mounting structure, wherein
the cylinder axis of the cylinder bore is inclined towards the handlebar mounting axis so that a first distance between the first end of the cylinder bore and the handlebar mounting axis is smaller than a second distance between the second end of the cylinder bore and the handlebar mounting axis, the first distance being spaced farther away from the pivot axis than the second distance is spaced from the pivot axis as viewed in a pivot axis direction parallel to the pivot axis, and
the pivot axis is located in an area between the cylinder axis and the handlebar mounting axis as viewed in the pivot axis direction; and
a hydraulic reservoir connected to the cylinder bore.

2. The hydraulic operating device according to claim 1, wherein
the hydraulic reservoir is disposed above the cylinder bore while in the mounted state.

3. The hydraulic operating device according to claim 1, wherein
the cylinder axis and the handlebar mounting axis form an inclination angle in a range from one degrees to twenty-five degrees.

4. The hydraulic operating device according to claim/ wherein
the inclination angle is in a range from five degrees to fifteen degrees.

5. The hydraulic operating device according to claim 1, wherein
a piston position adjustment that is operatively coupled to the piston.

6. The hydraulic operating device according to claim 1, wherein
the base includes a hose attachment port disposed on one of a downwardly facing side and a rearwardly facing side of the base while in the mounted state.

7. The hydraulic operating device according to claim 6, wherein
the hose attachment port has a center port axis that is not parallel to the pivot axis.

8. The hydraulic operating device according to claim 1, wherein
the operating member includes an operating lever.

9. The hydraulic operating device according to claim 8, wherein
the operating lever has a user contact surface that is elongated in a direction not parallel to a plane that is perpendicular to the pivot axis and that includes the cylinder axis.

10. The hydraulic operating device according to claim 1, wherein
a linear distance between the pivot axis and the handlebar mounting axis as viewed in the pivot axis direction is in a range from fifteen millimeters to thirty millimeters.

11. The hydraulic operating device according to claim 1, wherein
a linear distance between the pivot axis and the cylinder axis as viewed in the pivot axis direction is in a range from three millimeters to fifteen millimeters.

12. The hydraulic operating device according to claim 1, further comprising
a torque transmission mechanism operatively connecting the piston and the operating member to push the piston at a non-constant actuation ratio of a movement of the operating member to a movement of the piston.

13. The hydraulic operating device according to claim 12, wherein
the torque transmission mechanism is configured to move the piston at a first actuation ratio with respect to a movement amount of the operating member during a beginning section of the movement of the operating member and to move the piston at a second actuation ratio with respect to the movement amount of the operating member during a subsequent section of the movement of the operating member, and
the first actuation ratio is larger than the second actuation ratio.

14. The hydraulic operating device according to claim 1, further comprising
a connecting rod operatively connected between the piston and the operating member, and
a cam guide supporting the connecting rod to the base, the cam guide being shaped to control movement of the piston at a non-constant actuation ratio of a movement of the operating member to a movement of the piston.

15. The hydraulic operating device according to claim 14, further comprising
a first torque transmission member movably mounted to the base; and
a second torque transmission member movably mounted to the base,
the first torque transmission member having a first contact portion configured to receive an input torque from the operating member and a second contact portion configured to transmit the input torque to the second torque transmission member,
the second torque transmission member having a third contact portion configured to receive a transmitted torque from the first torque transmission member and a fourth contact portion configured to transmit the transmitted torque to the connecting rod.

16. The hydraulic operating device according to claim 15, wherein
the first torque transmission member is pivotally coupled to the base, and
the second torque transmission member is pivotally coupled to the base.

17. The hydraulic operating device according to claim 16, wherein
the first torque transmission member is pivotally coupled to the base about the pivot axis, and
the second torque transmission member is pivotally coupled to the base about an additional pivot axis different from the pivot axis.

18. A hydraulic operating device for a human-powered vehicle, the hydraulic operating device comprising:
a base including a cylinder bore defining a cylinder axis and a hydraulic reservoir connected to the cylinder bore, the cylinder bore having a first end and a second end where the second end is spaced from the first end along the cylinder axis;
an operating member pivotally coupled to the base about a pivot axis between a rest position and an operated position;
a piston movably provided in the cylinder bore, the piston being coupled to the operating member to be pushed in response to a pivotal movement of the operating member from the rest position to the operated position; and
a handlebar mounting structure coupled to the base, the handlebar mounting structure defining a handlebar mounting axis that extends linearly along a handlebar in a mounted state in which the base is mounted to the handlebar by the handlebar mounting structure, wherein
the cylinder axis of the cylinder bore is inclined towards the handlebar mounting axis so that a first distance between the first end of the cylinder bore and the handlebar mounting axis is smaller than a second distance between the second end of the cylinder bore and the handlebar mounting axis, the first distance being spaced farther away from the pivot axis than the second distance is spaced from the pivot axis as viewed in a pivot axis direction parallel to the pivot axis, and
the hydraulic reservoir is offset from the handlebar mounting structure as viewed in the pivot axis direction.

19. A hydraulic operating device for a human-powered vehicle, the hydraulic operating device comprising:
a base including a cylinder bore defining a cylinder axis, the cylinder bore having a first end and a second end where the second end is spaced from the first end along the cylinder axis;
an operating member pivotally coupled to the base about a pivot axis between a rest position and an operated position;
a piston movably provided in the cylinder bore;
a handlebar mounting structure coupled to the base, the handlebar mounting structure defining a handlebar mounting axis that extends linearly along a handlebar in a mounted state in which the base is mounted to the handlebar by the handlebar mounting structure, wherein
the cylinder axis of the cylinder bore is inclined towards the handlebar mounting axis so that a first distance between the first end of the cylinder bore and the handlebar mounting axis is smaller than a second distance between the second end of the cylinder bore and the handlebar mounting axis, the first distance being spaced farther away from the pivot axis than the second distance is spaced from the pivot axis as viewed in a pivot axis direction parallel to the pivot axis, and
the pivot axis is located in an area between the cylinder axis and the handlebar mounting axis as viewed in the pivot axis direction, the piston being coupled to the operating member to be pulled in response to a pivotal movement of the operating member from the rest position to the operated position;
a hydraulic reservoir connected to the cylinder bore.

20. A hydraulic operating device for a human-powered vehicle, the hydraulic operating device comprising:
a base including a cylinder bore defining a cylinder axis, the cylinder bore having a first end and a second end where the second end is spaced from the first end along the cylinder axis;
an operating member pivotally coupled to the base about a pivot axis between a rest position and an operated position;
a piston movably provided in the cylinder bore;
a handlebar mounting structure coupled to the base, the handlebar mounting structure defining a handlebar mounting axis that extends linearly along a handlebar in a mounted state in which the base is mounted to the handlebar by the handlebar mounting structure, wherein
the cylinder axis of the cylinder bore is inclined towards the handlebar mounting axis so that a first distance between the first end of the cylinder bore and the handlebar mounting axis is smaller than a second distance between the second end of the cylinder bore and the handlebar mounting axis, the first distance being spaced farther away from the pivot axis than the second distance is spaced from the pivot axis as viewed in a pivot axis direction parallel to the pivot axis, and
the pivot axis is located in an area between the cylinder axis and the handlebar mounting axis as viewed in the pivot axis direction, the operating member further includes an operating member position adjustment; and
a hydraulic reservoir connected to the cylinder bore.

21. A hydraulic operating device for a human-powered vehicle, the hydraulic operating device comprising:
a base including a cylinder bore defining a cylinder axis, the cylinder bore having a first end and a second end where the second end is spaced from the first end along the cylinder axis, the base including a hose attachment port disposed on one of a downwardly facing side and a rearwardly facing side of the base while in the mounted state;
an operating member pivotally coupled to the base about a pivot axis between a rest position and an operated position;
a piston movably provided in the cylinder bore; and
a handlebar mounting structure coupled to the base, the handlebar mounting structure defining a handlebar mounting axis that extends linearly along a handlebar in a mounted state in which the base is mounted to the handlebar by the handlebar mounting structure, wherein
the cylinder axis of the cylinder bore is inclined towards the handlebar mounting axis so that a first distance between the first end of the cylinder bore and the handlebar mounting axis is smaller than a second distance between the second end of the cylinder bore and the handlebar mounting axis, the first distance being spaced farther away from the pivot axis than the second distance is spaced from the pivot axis as viewed in a pivot axis direction parallel to the pivot axis, and
the pivot axis is located in an area between the cylinder axis and the handlebar mounting axis as viewed in the pivot axis direction,
the hose attachment port being located in a ninety degree range with respect to the cylinder axis of the cylinder bore, and
the ninety degree range extending from a plane that is perpendicular to the pivot axis and that includes the cylinder axis to a plane that is parallel to the pivot axis and that includes the cylinder axis.

22. A hydraulic operating device for a human-powered vehicle, the hydraulic operating device comprising:
a base including a cylinder bore defining a cylinder axis and a hydraulic reservoir connected to the cylinder bore, the cylinder bore having a first end and a second end where the second end is spaced from the first end along the cylinder axis;
an operating member pivotally coupled to the base about a pivot axis between a rest position and an operated position;
a piston movably provided in the cylinder bore, the piston being coupled to the operating member to be pulled in response to a pivotal movement of the operating member from the rest position to the operated position; and
a handlebar mounting structure coupled to the base, the handlebar mounting structure defining a handlebar mounting axis that extends linearly along a handlebar in a mounted state in which the base is mounted to the handlebar by the handlebar mounting structure, wherein
the cylinder axis of the cylinder bore is inclined towards the handlebar mounting axis so that a first distance between the first end of the cylinder bore and the handlebar mounting axis is smaller than a second distance between the second end of the cylinder bore and the handlebar mounting axis, the first distance being spaced farther away from the pivot axis than the second distance is spaced from the pivot axis as viewed in a pivot axis direction parallel to the pivot axis, and the hydraulic reservoir is offset from the handlebar mounting structure as viewed in the pivot axis direction.

23. A hydraulic operating device for a human-powered vehicle, the hydraulic operating device comprising:

a base including a cylinder bore defining a cylinder axis and a hydraulic reservoir connected to the cylinder bore, the cylinder bore having a first end and a second end where the second end is spaced from the first end along the cylinder axis;

an operating member pivotally coupled to the base about a pivot axis between a rest position and an operated position, the operating member further including an operating member position adjustment;

a piston movably provided in the cylinder bore; and a handlebar mounting structure coupled to the base, the handlebar mounting structure defining a handlebar mounting axis that extends linearly along a handlebar in a mounted state in which the base is mounted to the handlebar by the handlebar mounting structure, wherein the cylinder axis of the cylinder bore is inclined towards the handlebar mounting axis so that a first distance between the first end of the cylinder bore and the handlebar mounting axis is smaller than a second distance between the second end of the cylinder bore and the handlebar mounting axis, the first distance being spaced farther away from the pivot axis than the second distance is spaced from the pivot axis as viewed in a pivot axis direction parallel to the pivot axis, and the hydraulic reservoir is offset from the handlebar mounting structure as viewed in the pivot axis direction.

24. A hydraulic operating device for a human-powered vehicle, the hydraulic operating device comprising:

a base including a cylinder bore defining a cylinder axis and a hydraulic reservoir connected to the cylinder bore, the cylinder bore having a first end and a second end where the second end is spaced from the first end along the cylinder axis, the base including a hose attachment port disposed on one of a downwardly facing side and a rearwardly facing side of the base while in the mounted state;

an operating member pivotally coupled to the base about a pivot axis between a rest position and an operated position;

a piston movably provided in the cylinder bore; and a handlebar mounting structure coupled to the base, the handlebar mounting structure defining a handlebar mounting axis that extends linearly along a handlebar in a mounted state in which the base is mounted to the handlebar by the handlebar mounting structure, wherein the cylinder axis of the cylinder bore is inclined towards the handlebar mounting axis so that a first distance between the first end of the cylinder bore and the handlebar mounting axis is smaller than a second distance between the second end of the cylinder bore and the handlebar mounting axis, the first distance being spaced farther away from the pivot axis than the second distance is spaced from the pivot axis as viewed in a pivot axis direction parallel to the pivot axis, and the hydraulic reservoir is offset from the handlebar mounting structure as viewed in the pivot axis direction, the hose attachment port being located in a ninety degree range with respect to the cylinder axis of the cylinder bore, and the ninety degree range extending from a plane that is perpendicular to the pivot axis and that includes the cylinder axis to a plane that is parallel to the pivot axis and that includes the cylinder axis.

* * * * *